United States Patent
Maki et al.

(10) Patent No.: US 12,035,292 B2
(45) Date of Patent: Jul. 9, 2024

(54) MOBILE STATION, BASE STATION, TRANSMISSION METHOD AND RECEIVING METHOD

(71) Applicant: Panasonic Intellectual Property Corporation of America, Torrance, CA (US)

(72) Inventors: Shotaro Maki, Tokyo (JP); Ayako Horiuchi, Kanagawa (JP); Tetsuya Yamamoto, Kanagawa (JP); Yoshihiko Ogawa, Kanagawa (JP); Yihui Li, Singapore (SG); Madhav Gupta, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 663 days.

(21) Appl. No.: 17/256,694

(22) PCT Filed: Oct. 31, 2019

(86) PCT No.: PCT/JP2019/042881
§ 371 (c)(1),
(2) Date: Dec. 29, 2020

(87) PCT Pub. No.: WO2020/090998
PCT Pub. Date: May 7, 2020

(65) Prior Publication Data
US 2021/0368505 A1    Nov. 25, 2021

(30) Foreign Application Priority Data
Nov. 1, 2018    (JP) ................................ 2018-206872

(51) Int. Cl.
*H04W 72/04*    (2023.01)
*H04L 5/00*    (2006.01)
(Continued)

(52) U.S. Cl.
CPC ....... *H04W 72/0453* (2013.01); *H04L 5/0092* (2013.01); *H04W 16/14* (2013.01); *H04W 72/23* (2023.01)

(58) Field of Classification Search
CPC . H04W 72/0453; H04W 72/23; H04W 16/14; H04W 72/042; H01L 5/0092
See application file for complete search history.

(56) References Cited

U.S. PATENT DOCUMENTS

2013/0279439 A1   10/2013   Takahashi et al.
2014/0341179 A1*   11/2014   Yokomakura ..... H04W 72/0453
                                                                    370/329
(Continued)

FOREIGN PATENT DOCUMENTS

CA          3066685 A1 *   12/2018   ......... H04L 27/0006
JP          2012-90013 A    5/2020
WO    WO 2018074068 A1    4/2018

OTHER PUBLICATIONS

Extended European Search Report, dated Nov. 22, 2021, for European Application No. 19879010.7-1231, 13 pages.
(Continued)

*Primary Examiner* — Derrick V Rose
(74) *Attorney, Agent, or Firm* — Seed IP Law Group LLP

(57) ABSTRACT

In an operation in a license-exempt band (unlicensed band), the present invention contributes to the provision of a mobile station, a base station, a transmission method and a receiving method which suitably transmit and receive a signal. The mobile station 200 includes: a transmission unit 205 which transmits an uplink signal; and a control unit 201 which, when a first number indicating a first resource amount that can be used in the transmission of the uplink signal includes a third number, which is different from a specific second number, as a prime factor, controls the transmission of a (Continued)

signal of a fourth number that does not include the third number as the prime factor by using a second resource.

14 Claims, 10 Drawing Sheets

(51) Int. Cl.
*H04W 16/14* (2009.01)
*H04W 72/0453* (2023.01)
*H04W 72/23* (2023.01)

(56) References Cited

U.S. PATENT DOCUMENTS

2019/0320463 A1  10/2019  Yamada et al.
2020/0413426 A1* 12/2020  Park ..................... H04L 5/0037

OTHER PUBLICATIONS

Ericsson, "DFT size for uplink transmissions," R1-063127, Agenda Item: 6.2, TSG-RAN WG1 #47, Riga, Latvia, Nov. 6-10, 2006, 2 pages.

NEC, "Discussion on UL Signals and Channels in NR-U," R1-1810811, Agenda Item: 7.2.2.3.2, 3GPP TSG RAN WG1 #94bis, Chengdu, China, Oct. 8-12, 2018, 7 pages.

3GPP TS 38.101-1 V15.3.0, "3$^{rd}$ Generation Partnership Project; Technical Specification Group Radio Access Network; NR; User Equipment (UE) radio transmission and reception; Part 1: Range 1 Standalone (Release 15)," Sep. 2018, 219 pages.

3GPP TS 38.211 V15.3.0, "3$^{rd}$ Generation Partnership Project; Technical Specification Group Radio Access Network; NR; Physical channels and modulation (Release 15)," Sep. 2018, 96 pages.

Ericsson, "On UL signals and channels," R1-1809203, Agenda Item: 7.2.2.3.2, 3GPP TSG-RAN WG1 Meeting #94, Gothenburg, Sweden, Aug. 20-24, 2018, 20 pages.

ETSI, "5 GHz RLAN; Harmonised Standard covering the essential requirements of article 3.2 of Directive 2014/53/EU," ETSI EN 301 893 V2.1.1, May 2017, 122 pages.

Frank, "Block-Interleaved Frequency Division Multiple Access and its Application in the Uplink of Future Mobile Radio Systems," Darmstadt Dissertation, 2010, 222 pages. (English text with German introduction).

Huawei, HiSilicon, "UL PHY channels for NR unlicensed," R1-1810125, Agenda Item: 7.2.2.3.2, 3GPP TSG RAN WG1 Meeting #94bis, Chengdu, China, Oct. 8-12, 2018, 20 pages.

International Search Report, dated Dec. 10, 2019, for International Application No. PCT/JP2019/042881, 2 pages.

Khan, "LTE for 4G Mobile Broadband; Air Interface Technologies and Performance," Section 4.5: FFT precoding complexity, 2009, 2 pages.

MediaTek Inc., "On UL signals and channels in NR-U," R1-1800441, Agenda item: 7.2.2.3.2, 3GPP TSG RAN WG1 Meeting #94-bis, Chengdu, China, Oct. 8-12, 2018, 11 pages.

NTT Docomo, Inc., "Revised WID on New Radio Access Technology," RP-181726, Agenda Item: 9.2.1, 3GPP TSG RAN Meeting #81, Gold Coast, Australia, Sep. 10-13, 2018, 13 pages.

NTT Docomo, Inc., "UL Signals and Channels for NR-U operation," R1-1811368, Agenda Item: 7.2.2.3.2, 3GPP TSG RAN WG1 Meeting #94bis, Chengdu, China, Oct. 8-12, 2018, 4 pages.

Qualcomm Incorporated, "Revised SID on NR-based Access to Unlicensed Spectrum," RP-181339, Agenda Item: 9.4.3, 3GPP TSG RAN Meeting #80, La Jolla, USA, Jun. 11-14, 2018, 5 pages.

Intel Corporation, "Enhancements to NR UL signals and channels for unlicensed operation," R1-1810765, 3GPP TSG RAN WG1 Meeting #94bis, Chengdu, China, Oct. 8-12, 2018, 12 pages.

Panasonic, "NR-U UL channels," R1-1810611, Agenda Item: 7.2.2.3.2 3GPP TSG RAN WG1 Meeting #94bis, Chengdu, China Oct. 8-12, 2018, 8 pages.

* cited by examiner

MOBILE STATION, BASE STATION, TRANSMISSION METHOD AND RECEIVING METHOD

TECHNICAL FIELD

The present disclosure relates to a mobile station, a base station, a transmission method, and a reception method.

BACKGROUND ART

A communication system called a 5th generation mobile communication system (5G) is now under study. An International Standardizing Body, 3GPP (3rd Generation Partnership Project), is discussing sophistication of the 5G communication system from the both the viewpoints of further advancing LTE (Long Term Evolution) and LTE-A (LTE-Advanced) systems and of developing an NR (NEW RAT (New Radio access technology)) (see, for example, Non-Patent Literature (NPL) 1) that is not always backward compatible with LTE and LTE-A.

Regarding to NR, studies targeting operation in an unlicensed band in addition to a licensed band are carried out (see, for example, NPL 2) as with LTE-LAA (License-Assisted Access). The operation in the unlicensed band is also referred to as, for example, NR-U (NR-based Access to Unlicensed Spectrum).

CITATION LIST

Patent Literature

PTL 1
Japanese Patent Application Laid-Open No. 2012-90013
Non-Patent Literatures
NPL 1
RP-181726, "Revised WID on New Radio Access Technology"
NPL 2
RP-181339, "Revised SID on NR-based Access to Unlicensed Spectrum"
NPL 3
ETSI EN 301 893 V2.1.1
NPL 4
3GPP TS 38.101-1 V15.3.0
NPL 5
"Block-Interleaved Frequency Division Multiple Access and its Application in the Uplink of Future Mobile Radio Systems", T. Frank
NPL 6
"LTE for 4G Mobile Broadband", F. Khan
NPL 7
3GPP TS 38.211 V15.3.0

SUMMARY OF INVENTION

With regard to the operation in the unlicensed band, however, methods of transmitting and receiving signals are not yet sufficiently studied.

One non-limiting and exemplary embodiment facilitates providing a mobile station, a base station, a transmission method, and a reception method that are able to appropriately transmit and receive signals in the operation in the unlicensed band.

A mobile station according to one exemplary embodiment of the present disclosure includes: transmission circuitry, which, in operation, transmits an uplink signal; and control circuitry, which, in operation, when a first number indicating an amount of a first resource usable in transmitting the uplink signal includes, as a prime factor, a third number different from a specific second number, controls transmission of a fourth number of signals, the transmission being performed using a second resource, the fourth number not including the third number as a prime factor.

A base station according to one exemplary embodiment of the present disclosure includes: reception circuitry, which, in operation, receives an uplink signal; and control circuitry, which, in operation, when a first number indicating an amount of a first resource usable in transmitting the uplink signal includes, as a prime factor, a third number different from a specific second number, controls reception of a fourth number of signals, the reception being performed using second resources, the fourth number not including the third number as a prime factor.

A transmission method according to one exemplary embodiment of the present disclosure includes: configuring, when a first number indicating an amount of a first resource usable in transmitting an uplink signal includes, as a prime factor, a third number different from a specific second number, the fourth number not including the third number as a prime factor; and controlling transmission of the fourth number of signals, the transmission being performed using a second resource.

A reception method according to one exemplary embodiment of the present disclosure includes: configuring, when a first number indicating an amount of a first resource usable in transmitting an uplink signal includes, as a prime factor, a third number different from a specific second number, a fourth number not including the third number as a prime factor; and controlling reception of the fourth number of signals, the reception being performed using a second resource.

A base station according to one exemplary embodiment of the present disclosure includes: reception circuitry, which, in operation, receives an uplink signal; and control circuitry, which, in operation, decides a first resource usable in transmitting the uplink signal, and controls a reception process of the uplink signal, the reception process being performed using the first resource, in which: the first resource has one or more bands positioned at a predetermined spacing among a plurality of bands that are obtained by dividing a predetermined frequency band, and the control circuitry configures the one or more bands in the first resource such that a number indicating an amount of resource included in the first resource does not include, as a prime factor, a third number different from a specific second number.

A mobile station according to one exemplary embodiment of the present disclosure includes: transmission circuitry, which, in operation, transmits a signal; and control circuitry, which, in operation, controls a transmission process of the signal, the transmission process being performed using usable a first resource, in which: the first resource has one or more bands positioned at a predetermined spacing among a plurality of bands that are obtained by dividing a predetermined frequency band, at least part of the plurality of bands has a different band width from remaining part, and a number indicating an amount of resource included in the first resource does not include, as a prime factor, a third number different from a specific second number.

It should be noted that general or specific embodiments may be implemented as a system, an apparatus, a method, an integrated circuit, a computer program, a storage medium, or any selective combination thereof.

According to one exemplary embodiment of the present disclosure, signals can be appropriately transmitted and received in the operation in the unlicensed band.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Embodiments of the present disclosure will be described in detail below with reference to the drawings.

As mentioned above, the studies targeting the operation of the NR system in the unlicensed band (for example, a frequency band lower than 7 GHz) are carried out.

With respect to the unlicensed band, an upper limit value of Power Spectral Density (hereinafter also referred to as PSD in some cases) is restricted by the laws, the standards, and so on. For example, according to the standards stipulated by ETSI (European Telecommunications Standards Institute) (see, for example, NPL 3), the upper limit value of PSD in the so-called 5 GHz band is configured to, for example, 10 dBm/MHz (17 dBm/MHz in some bands) even for a terminal with the power control function.

In order to transmit signals with higher transmission power under the limitation on PSD, it is effective to arrange resources to be distributed in the frequency domain. From that point of view, an allocation technique called an interlace allocation is considered in NR-U.

According to the allocation technique called the interlace allocation, a certain band (for example, 20 MHz) is divided into a plurality of interlaces. An interlace includes, for example, a plurality of consecutive sub-carrier groups. One consecutive sub-carrier group corresponds to, for example, one Physical Resource Block (hereinafter also referred to as PRB in some cases). The plurality of consecutive sub-carrier groups are arrayed at equal spacings or unequal spacings in the frequency domain. In other words, each interlace includes a plurality of PRBs arrayed at equal spacings or unequal spacings in the frequency domain.

For example, different interlaces include different resources. Thus, the resources do not overlap with each other between different interlaces. Furthermore, different identifiers are assigned to the different interlaces. The identifiers assigned to the interlaces are also referred to as interlace numbers in some cases.

The allocation technique called the interlace allocation is used in, for example, an uplink. A base station (hereinafter also referred to as, for example, Base Station, Node B, or gNB in some cases) is supposed to indicate one or multiple interlace numbers to a mobile station (hereinafter also referred to as, for example, a terminal or UE (User Equipment) in some cases). In such a case, the mobile station is supposed to assign signals to the resources corresponding to each indicated interlace number and to transmit the assigned signals.

Figure 1:
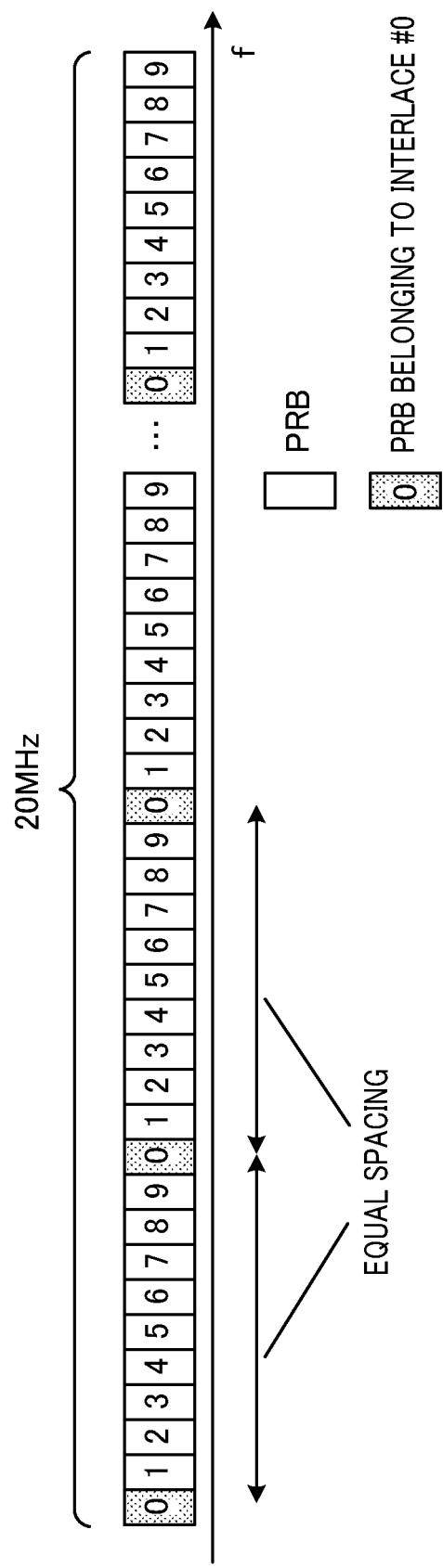
FIG. 1 illustrates an example of an interlace configuration in LTE LAA.

FIG. 1 illustrates an example of an interlace configuration in LTE LAA. In the example of FIG. 1, a band of 20 MHz is divided into 10 interlaces. Interlace numbers 0 to 9 are assigned respectively to the 10 interlaces. In the following description, the interlace with the number i (i is an integer larger than or equal to 0) is also denoted by the "interlace #i" in some cases.

Each interlace includes PRBs arrayed at equal spacings in the frequency domain. A number put in each PRB indicates the interlace number. The interlaces with different numbers in no way include the same PRB.

According to NR, it is considered to configure, in a band of 20 MHz included in a frequency band lower than 6 GHz, a maximum PRB allocation number to 106, 51, and 24 respectively for subcarrier spacings (hereinafter also referred to as SCSs in some cases) of 15 kHz, 30 kHz, and 60 kHz (see, for example, NPL 4). The maximum PRB allocation number considered in NR is a different value from the maximum PRB allocation number (namely, 100) in LTE.

With regard to the NR system in the unlicensed band (for example, a frequency band lower than 7 GHz), an interlace configuration is considered on the basis of the above-mentioned maximum PRB allocation number.

For example, 3GPP is discussing about a plurality of combinations of M and N on condition that the band of 20 MHz is divided into a number M of interlaces and each of the M interlaces includes a number N of PRBs. M and N are examples of parameters representing the interlace configuration. Furthermore, it is discussed that, when the maximum PRB allocation number is not a multiple of M, the number of PRBs included in a certain interlace is configured to be larger than the maximum PRB allocation number included in the other interlaces by one.

For example, the discussion is carried out on the case of configuring M to 12 when the subcarrier spacing is 15 kHz. When the subcarrier spacing is 15 kHz, the maximum PRB allocation number is 106 and 106 is not a multiple of M=12. Therefore, it is discussed to, when the subcarrier spacing is 15 kHz and M is 12, configure the interlaces such that some interlaces each include 9 PRBs and the other interlaces each include 8 PRBs.

In order to suppress PAPR (Peak to Average Power Ratio) of transmitted signals in an uplink, the mobile station is supposed to perform a DFT (Discrete Fourier Transform) process on the transmitted signals (see, for example, NPL 5). In such a case, the mobile station is supposed to perform mapping of the signal after the DFT process to the resources of interlaces. Moreover, when the mobile station transmits the signals after the DFT process, the base station is supposed to perform an IDFT (Inverse Discrete Fourier Transform) process in a reception process.

Regarding the DFT process using FFT (Fast Fourier Transform), it is known that an amount of computation reduces when a DFT size can be fractionized into relatively small prime numbers (see, for example, NPL 6). The DFT size corresponds to, for example, the number of outputs after the DFT process. Furthermore, regarding the IDFT process using IFFT (Inverse Fast Fourier Transform), it is known that an amount of computation reduces when an IDFT size similar to the DFT size can be fractionized into relatively small prime numbers. Taking the above point into account, one example of conditions is specified such that, when a signal waveform based on DFT-S-OFDM (DFT-Spread-Orthogonal Frequency Division Multiplexing) is used in the uplink of the NR system, the number of subcarriers allocated to the mobile station is a number including at least one prime factor among 2, 3 and 5 (see, for example, NPL 7). In other words, it is specified as a condition that the number of the subcarriers allocated to the mobile station is a number not including any prime factor different from 2, 3 and 5.

In LTE LAA operating the LTE system in the unlicensed band, because the combination of the numbers of M and N representing the interlace configuration is (M, N)=(10, 10) or (M, N)=(10, 5), the number of PRBs allocated to the mobile station is a multiple of 10. Thus, the number of allocated subcarriers is a multiple of 120. Here, because 120 does not include any prime factor different from 2, 3 and 5, the above-described condition can be relatively easily satisfied in LTE LAA.

In the interlace configuration that is an item under consideration in NR-U, the number of the allocated subcarriers may include a prime factor different from 2, 3 and 5. Such a point is described below in connection with an example in which the subcarrier spacing is 15 kHz and the combination of the numbers of M and N representing the interlace configuration is (M, N)=(12, 8 or 9).

The combination of M and N representing the interlace configuration, which is the item under consideration in NR-U, is not limited to (M, N)=(12, 8 or 9). For example, when the subcarrier spacing is 15 kHz, the combination of the numbers of M and N representing the interlace configuration may be (M, N)=(10, 10 or 11) or (M, N)=(8, 13 or 14). When the subcarrier spacing is 30 kHz, the combination of the numbers of M and N representing the interlace configuration may be (M, N)=(6, 8 or 9), (M, N)=(5, 10 or 11), or (M, N)=(4, 12 or 13). When the subcarrier spacing is 60 kHz, the combination of the numbers of M and N representing the interlace configuration may be (M, N)=(4, 6), (M, N)=(3, 8), or (M, N)=(2, 12). Furthermore, when the subcarrier spacing is 60 kHz and 26 PRBs are included in a band width of 20 MHz, the combination of the numbers of M and N representing the interlace configuration may be (M, N)=(4, 6 or 7), (M, N)=(2, 13), or (M, N)=(3, 8 or 9).

Figure 2:
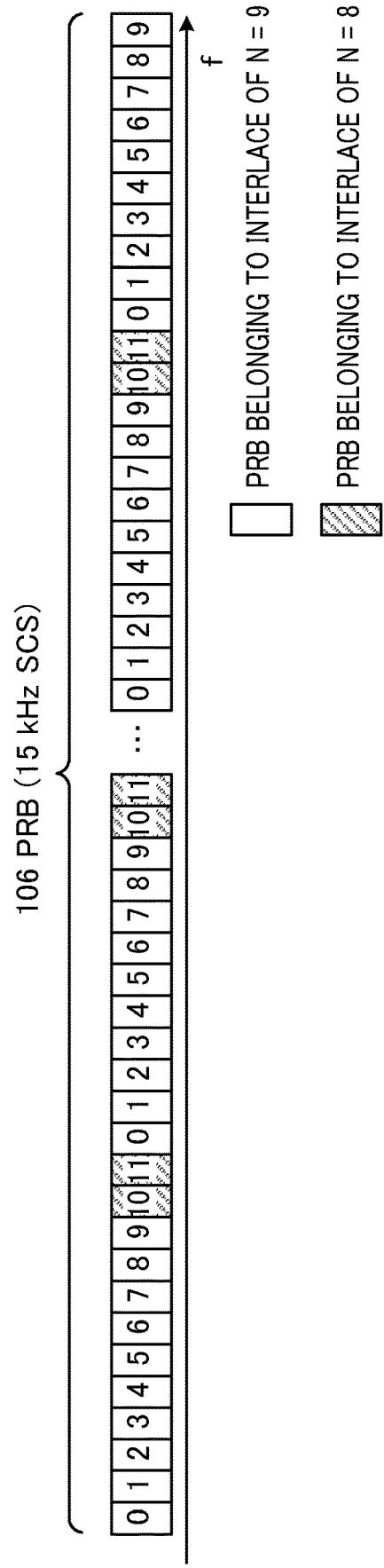
FIG. 2 illustrates an example of an interlace configuration in NR-U.

FIG. 2 illustrates an example of an interlace configuration in NR-U. In the example of FIG. 2, the interlace of N=8 (namely, the interlace including 8 PRBs) and the interlace of N=9 (namely, the interlace including 9 PRBs) may be both allocated to the mobile station in some cases.

For example, when one interlace of N=8 and one interlace of N=9 are allocated to the mobile station, the number of PRBs allocated to the mobile station is 17, and hence the number of subcarriers allocated to the mobile station is 204. Because 204 includes a relatively large prime factor 17, there is a possibility that the amount of computation executed in the DFT process increases, when the mobile station performs the DFT process of signals for which mapping to the 204 subcarriers is to be performed. Moreover, there is a possibility that the amount of computation executed in the IDFT process increases as in the DFT process, when the base station performs the IDFT process of the signals for which the mapping to the 204 subcarriers has been performed by the mobile station.

The present disclosure is described below in connection with an example of the technique with which resources can be efficiently utilized without increasing the amount of computation executed in each of a DFT process and an IDFT process corresponding to the DFT process.

Embodiment 1

[Outline of Communication System]

A communication system according to an embodiment of the present disclosure includes base station 100 and mobile station 200. In the following description, by way of example, base station 100 determines resources to be allocated to mobile station 200 and indicates information indicating the determined resources. In accordance with the indication, mobile station 200 performs a signal transmission process including a process for mapping to the resources and transmits signals to base station 100.

Figure 3:
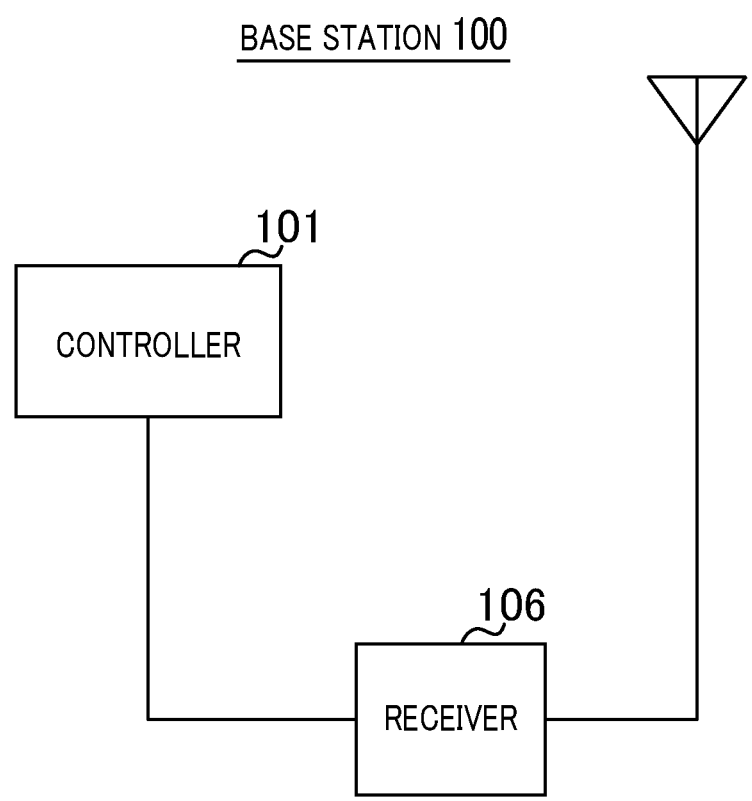
FIG. 3 is a block diagram illustrating a configuration of part of a base station according to Embodiment 1.

FIG. 3 is a block diagram illustrating a configuration of part of base station 100 according to Embodiment 1 of the present disclosure. In base station 100 illustrated in FIG. 3, receiver 106 receives an uplink signal, and when a first number indicating an amount of a first resource usable to transmit the uplink signal includes, as a prime factor, a third number different from a specific second number, controller 101 controls reception of a fourth number of signals, the reception being performed using a second resource, the fourth number not including the third number as a prime factor.

Figure 4:
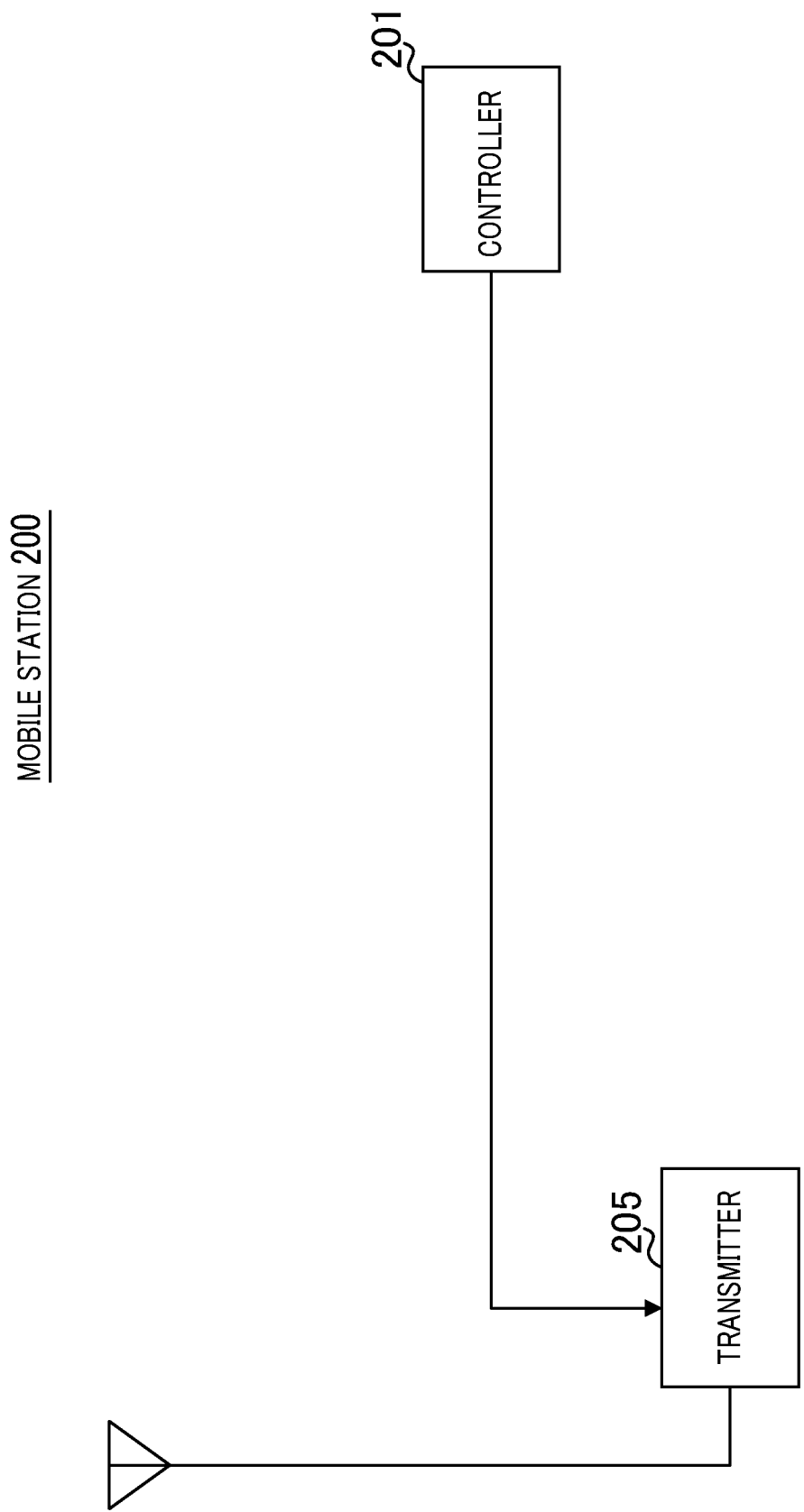
FIG. 4 is a block diagram illustrating a configuration of part of a mobile station according to Embodiment 1.

FIG. 4 is a block diagram illustrating a configuration of part of the mobile station 200 according to Embodiment 1 of the present disclosure. In mobile station 200 illustrated in FIG. 4, transmitter 205 transmits the uplink signal, and when the first number indicating the amount of the first resource usable to transmit the uplink signal includes, as a prime factor, the third number different from the specific second number, controller 201 controls transmission of the fourth number of signals, the transmission being performed using the second resource, the fourth number not including the third number as a prime factor.

[Configuration of Base Station]

Figure 5:
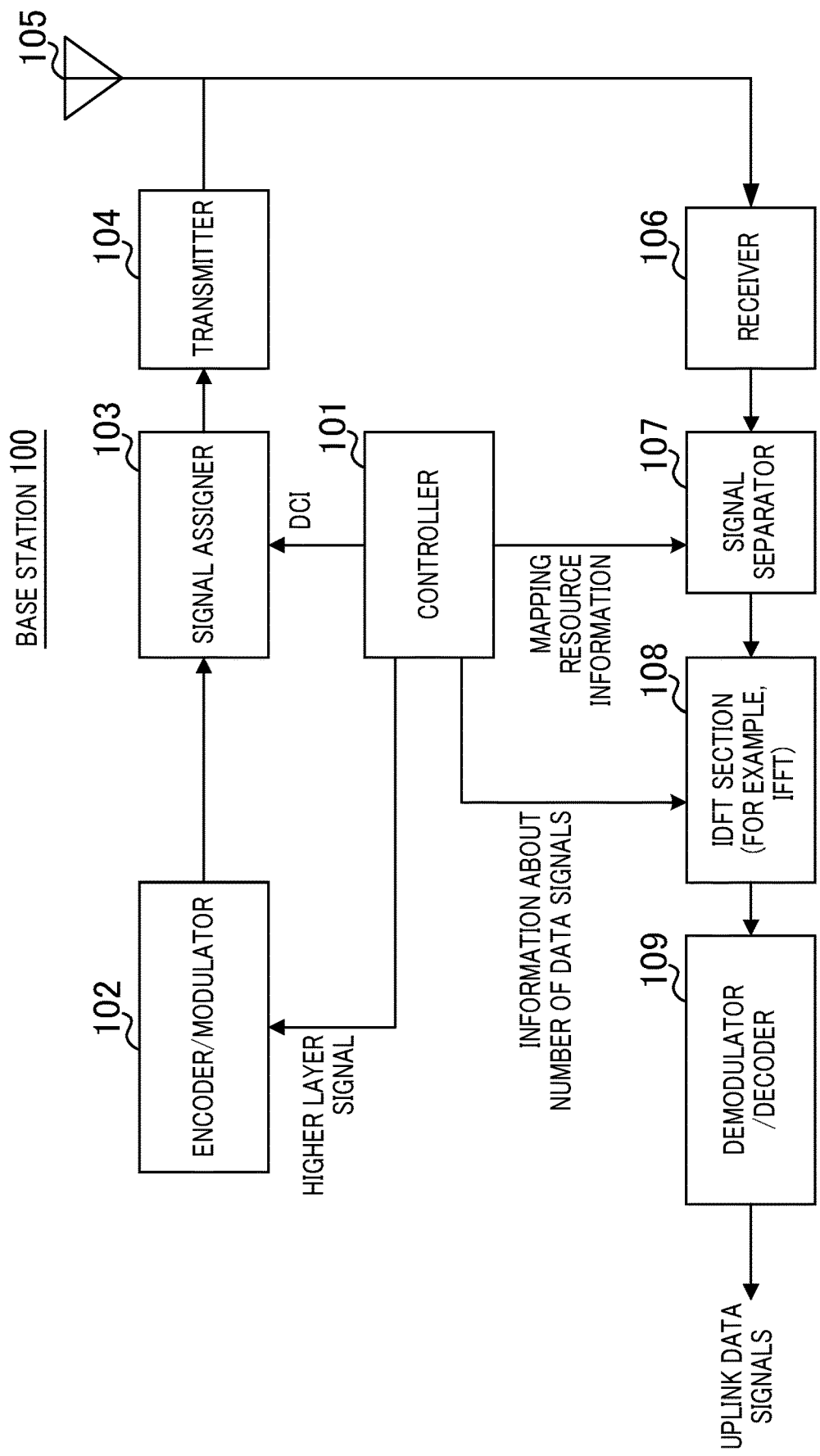
FIG. 5 is a block diagram illustrating a configuration of the base station according to Embodiment 1.

FIG. 5 is a block diagram illustrating a configuration of the base station 100 according to Embodiment 1.

In FIG. 5, base station 100 includes controller 101, encoder/modulator 102, signal assigner 103, transmitter 104, antenna 105, receiver 106, signal separator 107, IDFT (Inverse Discrete Fourier Transform) section 108, and demodulator/decoder 109.

For example, controller 101 schedules the uplink and determines the resources that are allocated to mobile station 200. Controller 101 outputs allocation resource information (for example, an interlace number assigned to uplink transmission for mobile station 200) to encoder/modulator 102 and signal assigner 103. The allocation resource information output to signal assigner 103 may be included in, for example, DCI (Downlink Control Information). The allocation resource information output to encoder/modulator 102 may be included in, for example, a higher layer signal.

When a number indicating an amount of resources having been allocated to mobile station 200 includes a prime factor different from one or more specific numbers, controller 101 controls a reception process on an assumption that the resources to which the uplink signals received from mobile station 200 are mapped and the resources having been allocated to mobile station 200 are different from each other.

Although the following description is made in connection with an example in which the uplink signals are data signals including uplink data, the uplink signals in the present disclosure may include signals different from the data signals.

Here, the number indicating the amount of resource is, for example, the number of subcarriers included in the resources. The specific numbers are relatively small prime number such as 2, 3 and 5, for example. The wording that the resources to which the data signals are mapped are different from the allocated resources correspond to, for example, a situation in which the number and/or the positions of subcarriers to which the data signals are mapped are different from the number and/or the positions of allocated subcarriers. Moreover, the wording that the resources to which the data signals are mapped are different from the allocated resources may include a situation in which the number of received data signals is different from the number of data signals receivable in the allocated resources.

The number indicating the amount of resource is not limited to the number of subcarriers. The number indicating the amount of resource may be, for example, the number of subcarrier groups or the number of PRBs. The specific numbers are not limited to 2, 3 and 5. The specific numbers may include a prime number different from 2, 3 and 5, or at least one of 2, 3 and 5 may be excluded from the specific numbers.

For example, when the number of the allocated subcarriers includes a prime factor different from the specific numbers, controller 101 may change at least one among the number and the positions of the subcarriers to which the data signals are mapped and the number of the data signals to a value different from that for the allocated resources. For example, controller 101 may change at least one among the number and the positions of the subcarriers and the number of the data signals, which are included in the allocation resource information. Information after being changed indicates the number of the resources to which the data signals are to be mapped and/or the number of uplink data signals to be transmitted from mobile station 200. In another example, the number of the data signals after being changed may be the number of the data signals to be output from IDFT section 108. In the following description, the information after being changed is also referred to as mapping resource information in some cases. Controller 101 outputs the mapping resource information to signal separator 107. Furthermore, controller 101 outputs the information about the number of the uplink data signals to IDFT section 108.

Encoder/modulator 102 receives the higher layer signal as an input and executes error correction coding and modulation on the input higher layer signal. Encoder/modulator 102 outputs signals after the error correction coding and the modulation to signal assigner 103.

Signal assigner 103 arranges (maps) the signals obtained from encoder/modulator 102 and/or DCI obtained from controller 101 to resources that are specified in the time domain and the frequency domain. Signal assigner 103 outputs the mapped signals to transmitter 104.

Transmitter 104 executes a radio transmission process, such as frequency conversion (for example, up conversion) using a carrier wave, on the signals received from signal assigner 103 and outputs the signals after the radio transmission process to antenna 105.

Antenna 105 radiates the signals (downlink signals) received from transmitter 104 toward mobile station 200. In addition, antenna 105 receives the uplink signals transmitted from mobile station 200 and outputs the received uplink signals to receiver 106.

Receiver 106 executes a radio reception process, such as frequency conversion (for example, down conversion), on the signals received from antenna 105 and outputs the signals after the radio reception process to signal separator 107.

Signal separator 107 extracts, in accordance with the mapping resource information received from controller 101, the data signals included in the signals that have been received from receiver 106. For example, signal separator 107 specifies, in accordance with the mapping resource information, the resource positions specified in the time domain and the frequency domain, and then extracts the data signals mapped to the specified positions. Signal separator 107 outputs the extracted data signals to IDFT section 108.

IDFT section 108 executes an IDFT process (for example, an IFFT process) on the data signals received from signal separator 107. IDFT section 108 outputs the data signals after the IDFT process to demodulator/decoder 109. When the number of the data signals received from signal separator 107 is different from the number of the data signals which is indicated by the information received from controller 101, IDFT section 108 may execute a signal interpolation process or a signal thinning process in the IDFT process. In such a case, the number of the signals output from IDFT section 108 may be the same as the number of the data signals which is indicated by the information received from controller 101.

Demodulator/decoder 109 demodulates and decodes the data signals received from IDFT section 108.

[Configuration of Mobile Station]

Figure 6:
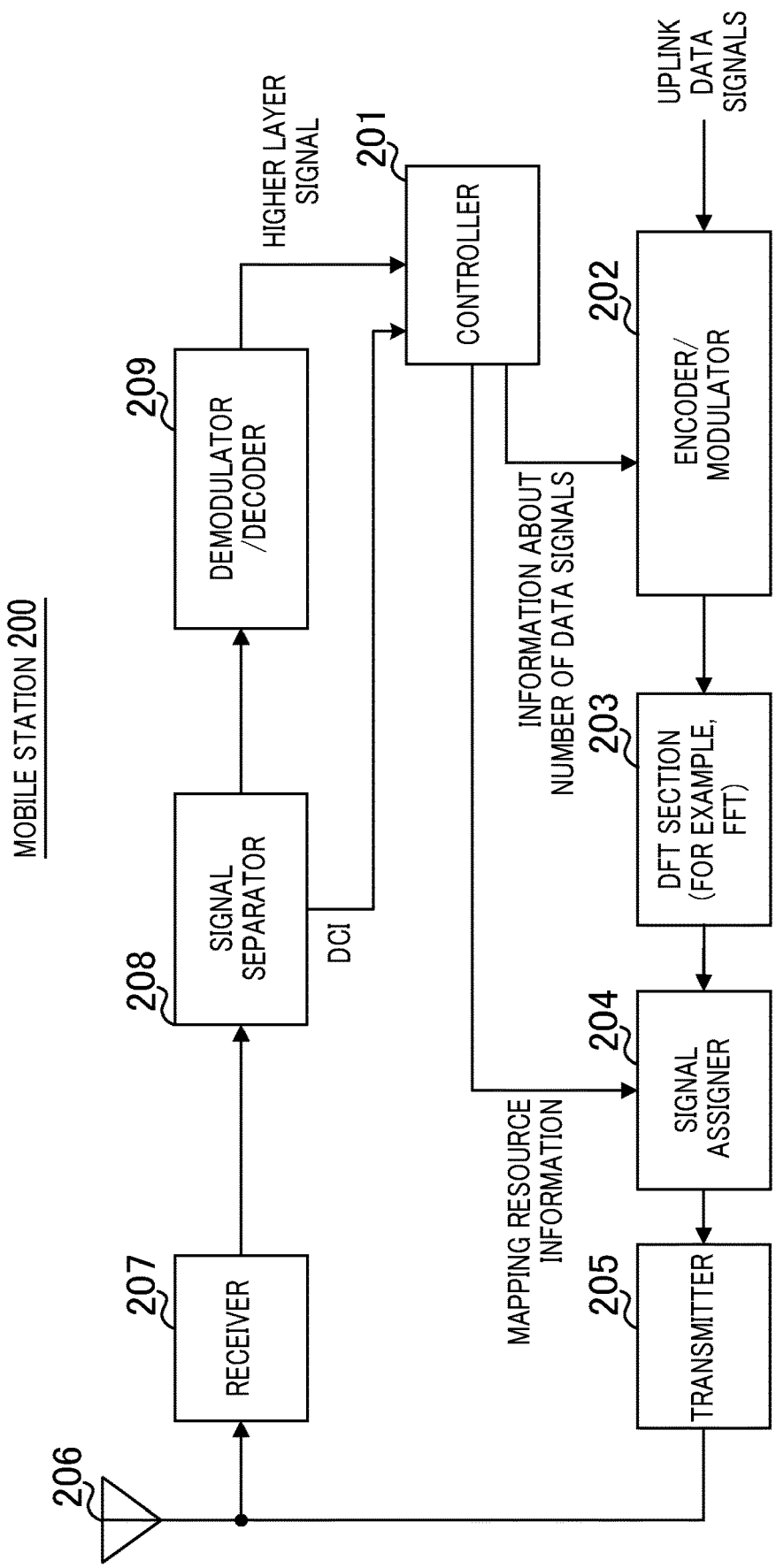
FIG. 6 is a block diagram illustrating a configuration of the mobile station according to Embodiment 1.

FIG. 6 is a block diagram illustrating a configuration of the mobile station 200 according to Embodiment 1.

In FIG. 6, mobile station 200 includes controller 201, encoder/modulator 202, DFT section 203, signal assigner 204, transmitter 205, antenna 206, receiver 207, signal separator 208, and demodulator/decoder 209.

Controller 201 obtains information (for example, the above-described allocation resource information) indicating uplink resources that have been allocated to mobile station 200 by base station 100, and controls a transmission process for the uplink signals. For example, controller 201 outputs, in accordance with the DCI received from signal separator 208 and/or the higher layer signal received from demodulator/decoder 209, the information indicating the uplink resources, which have been allocated to mobile station 200, to encoder/modulator 202 and/or signal assigner 204.

For example, when the number indicating the amount of the resources having been allocated to mobile station 200 includes a prime factor different from the specific numbers, controller 201 controls the transmission process on an assumption that the resources having been allocated to mobile station 200 and the resources to which the data signals are mapped are different from each other.

For example, when the number of the allocated subcarriers includes a prime factor different from the specific numbers, controller 201 may change at least one among the number and the positions of the subcarriers to which the data signals are mapped and the number of the data signals to a value different from that for the allocated resources. For example, controller 201 may change at least one among the number and the positions of the subcarriers and the number of the data signals, which are included in the allocation resource information. Information (above-described mapping resource information) after being changed indicates the number of the resources to which the data signals are to be arranged (mapped) and/or the number of uplink data signals to be transmitted. In another example, the number of the data signals after being changed may be the number of the data signals to be output from DFT section 203 or the number of the data signals to be input to DFT section 203. Controller 201 outputs the mapping resource information to signal assigner 204. Furthermore, controller 201 outputs the information about the number of the uplink data signals to encoder/modulator 202.

Antenna 206 receives the downlink signals transmitted from base station 100 and outputs the received downlink signals to receiver 207. In addition, antenna 206 radiates the uplink signals received from transmitter 205 toward base station 100.

Receiver 207 executes a radio reception process, such as frequency conversion (for example, down conversion), on the signals received from antenna 206 and outputs the signals after the radio reception process to signal separator 208.

Signal separator 208 extracts downlink data signals and/or control information (for example, DCI), et., which are included in the downlink signals that have been received from receiver 207. For example, signal separator 208 specifies the resource positions to which the downlink data signals and/or the control information has been mapped, and then extracts the downlink data signals and/or the control signal mapped to the specified positions. Signal separator 208 outputs the downlink data signals to demodulator/decoder 209 and further outputs the control information to controller 201.

Demodulator/decoder 209 demodulates and decodes the downlink data signals received from signal separator 208. Demodulator/decoder 209 outputs the decoded signal (higher layer signal) to the controller 201.

Encoder/modulator 202 executes error correction coding and modulation on the uplink data in accordance with the information about the number of the data signals, which has been received from controller 201, and outputs the resulting signals to DFT section 203.

DFT section 203 executes a DFT process (for example, a FFT process) on the signals received from encoder/modulator 202 and outputs the data signals to signal assigner 204.

Signal assigner 204 maps, in accordance with the resource mapping information received from controller 201, the data signals received from DFT section 203 to the time domain and the frequency domain. Signal assigner 204 outputs the mapped signals to the transmitter.

Transmitter 205 executes a radio transmission process, such as frequency conversion (for example, up conversion) using a carrier wave, on the signals received from signal assigner 204 and outputs the signals after the radio transmission process to antenna 206.

An example of an operation sequence between base station 100 and mobile station 200 will be described below.

Figure 7:
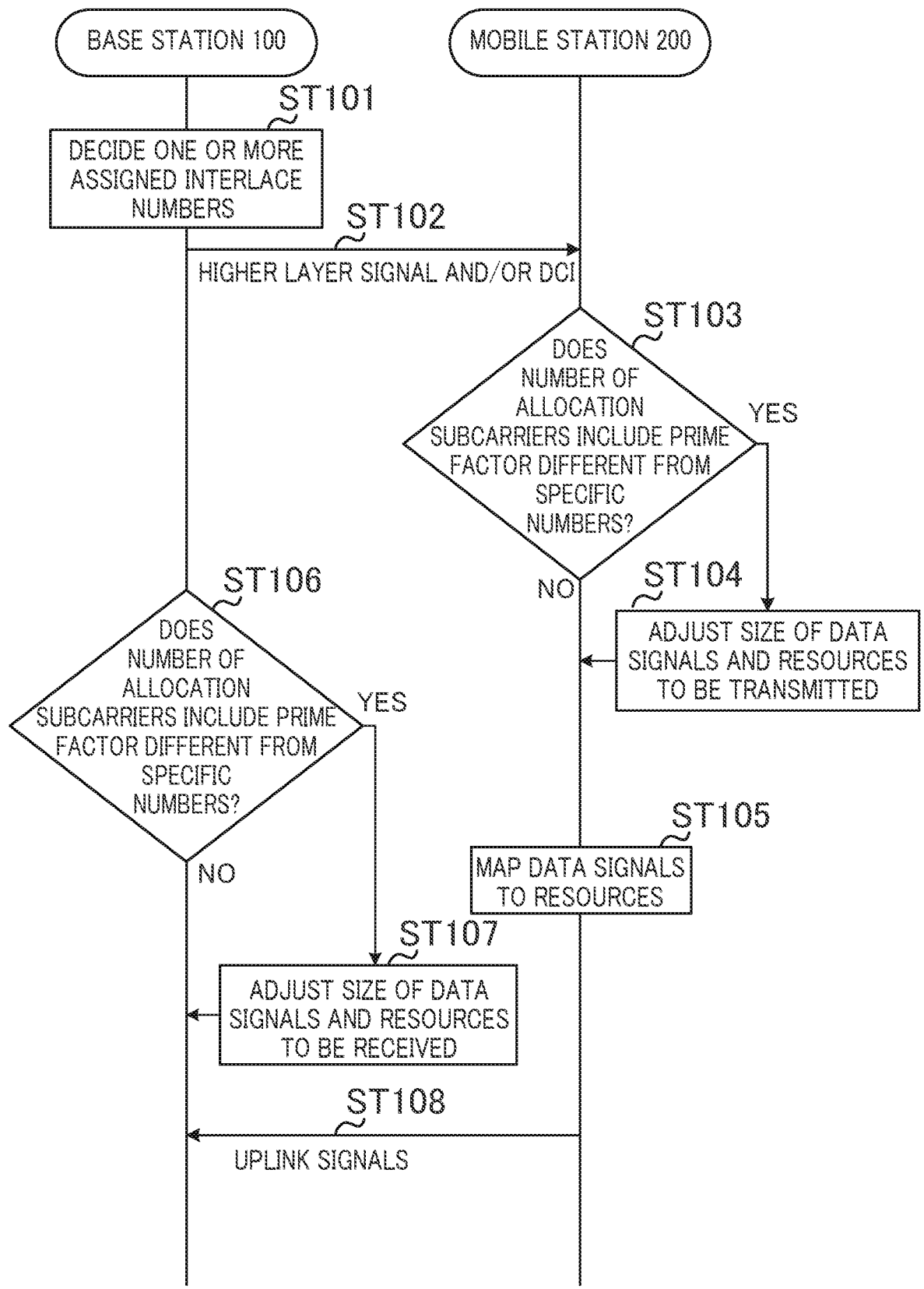
FIG. 7 illustrates an example of an operation sequence between the base station and the mobile station according to Embodiment 1.

FIG. 7 illustrates an example of the operation sequence between base station 100 and mobile station 200 according to Embodiment 1.

In the following description, the resources allocated to mobile station 200 by base station 100 are also referred to as "allocation resource" in some case. The resources to which the uplink data signals are mapped by mobile station 200 are also referred to as "mapping resource" in some case. Furthermore, when the resources are represented by the subcarriers, the allocation resource and the mapping resource are replaced respectively with "allocation subcarrier" and "mapping subcarrier" in some cases.

Base station 100 decides one or more interlace numbers that are assigned to mobile station 200 (ST101).

Base station 100 indicates information (allocation resource information) including the decided interlace numbers to mobile station 200 by using the higher layer signal and/or DCI (ST102).

Mobile station 200 determines whether the number of the allocation subcarriers, which has been decided in accordance with the indication, includes a prime factor different from the specific numbers (ST103).

If the number of the allocation subcarriers does not include any prime factor different from the specific numbers (NO in ST103), mobile station 200 executes a process of ST105.

If the number of the allocation subcarriers includes a prime factor different from the specific numbers (YES in ST103), mobile station 200 adjusts a size of data signals to be transmitted and/or resources to which the data signals are mapped (ST104). The adjustment of the size of the transmitted data signals may be performed by, for example, adjusting (changing) the number of the transmitted data signals. The adjustment of the resources to which the data signals are mapped may be performed by, for example, adjusting (changing) an amount of the resources to which the data signals are mapped and/or the positions of those resources. Furthermore, as described above, the resources to which the data signals are mapped may correspond to the mapping resources. Then, mobile station 200 executes a process of ST105.

Mobile station 200 arranges (maps) the data signals to the resources (ST105).

After the process of ST102, base station 100 determines whether the number of the allocation subcarriers includes a prime factor different from the specific numbers (ST106).

If the number of the allocation subcarriers does not include any prime factor different from the specific numbers (NO in ST106), base station 100 executes a reception process of ST108.

If the number of the allocation subcarriers includes a prime factor different from the specific numbers (YES in ST106), base station 100 adjusts a size of data signals to be received and/or resources to which the received data signals have been mapped (ST107). The adjustment of the size of the received data signals may be performed by, for example, adjusting (changing) the number of the received data signals. The adjustment of the resources to which the data signals have been mapped may be performed by, for example, adjusting (changing) an amount of the resources to which the data signals have been mapped and/or the positions of those resources. Furthermore, as described above, the resources to which the data signals have been mapped may correspond to the mapping resources. Then, base station 100 executes the reception process of ST108.

Mobile station 200 transmits the uplink signals, and base station 100 receives the uplink signals (ST108).

Although FIG. 7 illustrates an example in which base station 100 executes the process of ST106 after ST102 and further executes the process of ST107 in the case of YES in ST106, base station 100 may execute the process of ST106 between ST101 and ST102 and further executes the process of ST107 in the case of YES in ST106. In such a modified example, base station 100 may indicate information (for example, the mapping resource information) after the adjustment in ST107 to mobile station 200 in ST102 by using the higher layer signal and/or DCI. In that example, mobile station 200 is no longer required to execute the processes of ST103 and ST104.

The following description is made in connection with examples of configuring the resources, which are allocated to mobile station 200, by base station 100, and with examples of configuring the resources to which the data signals are mapped by mobile station 200.

[First Example of Allocation Resources and Mapping Resources]

An example of deciding the resources, which are allocated to mobile station 200, by the base station and an example of deciding the resources to which the data signals are mapped by mobile station 200 are described, by way of example, in connection with the case in which the subcarrier spacing is 15 kHz and the interlace configuration is given by M=10 and N=8 or 9.

The interlace configuration in the case of M=10 and N=8 or 9 on condition of the subcarrier spacing being 15 kHz is as per illustrated in FIG. 2, for example.

Controller 101 decides one or more interlace numbers in the configuration illustrated in FIG. 2 and further decides, as the allocation resources, the resources (for example, PRBs) corresponding to the decided interlace numbers.

Figure 8:
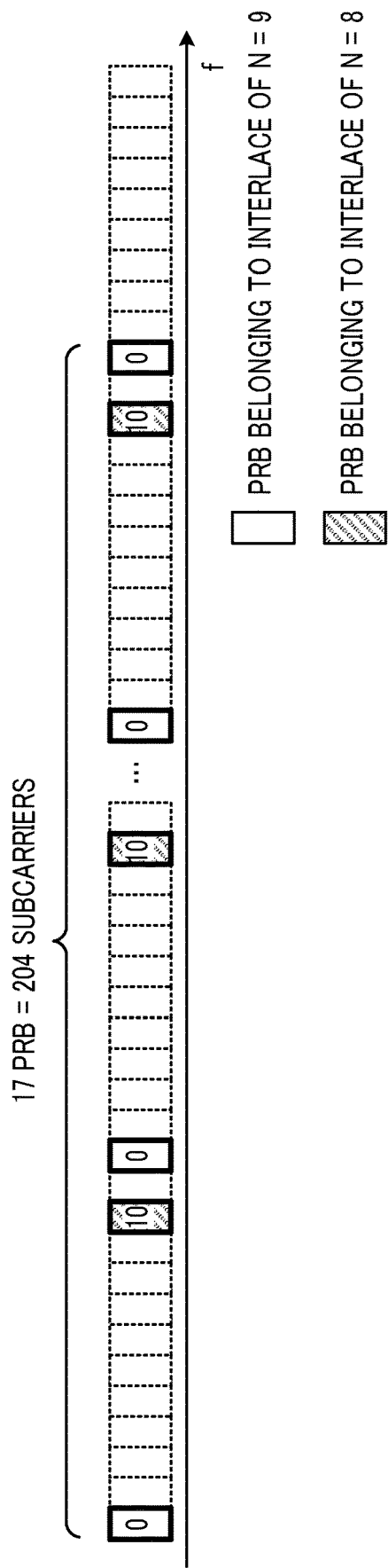
FIG. 8 illustrates an example of allocation resources.

FIG. 8 illustrates an example of the allocation resources. In the example of FIG. 8, an interlace #0 and an interlace #10 are assigned to mobile station 200. The interlace #0 is an interlace of N=9 (namely, an interlace including 9 PRBs), and the interlace #10 is an interlace of N=8 (namely, an interlace including 8 PRBs).

In the above-mentioned case, base station 100 indicates the allocation resource information, indicating that the allocation resource are the interlace #0 and the interlace #10, to mobile station 200 by using DCI and/or the higher layer signal.

In accordance with the obtained allocation resource information, controller 201 in mobile station 200 decides that the allocation resources are the interlaces #0 and #10. Then, controller 201 decides a resource amount of the allocation resources. For example, when the resource amount is expressed by the number of subcarriers, controller 201 decides the number of the allocation subcarriers. For example, because the number of PRBs belonging to the interlace #0 is 9, the number of PRBs belonging to the interlace #10 is 8, and one PRB includes 12 subcarriers, controller 201 decides that the number of the allocation subcarriers is 204.

Then, controller 201 determines whether the number of the allocation subcarriers includes a prime factor different from the specific numbers. In the case in which the specific numbers are 2, 3 and 5, for example, because the number of the allocation subcarriers is 204=2×2×3×17, controller 201 determines that the number of the allocation subcarriers includes a prime factor, namely 17, different from 2, 3 and 5.

In the above-mentioned case, controller 201 may change at least one among the number and the positions of the mapping subcarriers and the number of the data signals to a value different from that in the allocation resource information.

For example, controller 201 may configure, as the number of the data signals output from DFT section 203, any one of numbers that are smaller than or equal to the number of the allocation subcarriers (or smaller than the number of the allocation subcarriers) and that do not include any prime factor different from the specific numbers (namely, that include only the specific numbers as prime factors thereof). Incidentally, controller 201 may configure the number of the mapping subcarriers to be the same as the configured number of the data signals.

For example, a maximum one among numbers that are smaller than or equal to the number of the allocation subcarriers and that do not include any prime factor different from the specific numbers may be configured to the same as the number of the data signals and the number of the mapping subcarriers.

In the case of the above-described example, the number of the allocation subcarriers is 204 and the specific numbers are 2, 3 and 5. In that case, the maximum one among the numbers that are smaller than or equal to the number of the allocation subcarriers and that do not include any prime factor different from the specific numbers is 200 ($=2^3 \times 5^2$).

In the above-described case, controller 201 configures the number of the data signals and the number of the mapping subcarriers to 200.

Instead, controller 201 may configure, as the number of the data signals and the number of the mapping subcarriers, a number smaller than the maximum one among the numbers that are smaller than or equal to the number of the allocation subcarriers and that do not include any prime factor different from the specific numbers. For example, controller 201 may configure the number of the data signals and the number of the mapping subcarriers to 180 ($=2^2 \times 3^2 \times 5$) or 150 ($=2 \times 3 \times 5^2$).

Then, controller 201 configures the positions of the mapping subcarriers among the allocation subcarriers. A method of configuring the positions of the mapping subcarriers is not limited to a particular one. For example, any suitable one of Configuring Method 1 to Configuring Method 5, described below, may be used.

<Configuring Method 1>

For example, controller 201 may configure, as the mapping subcarriers, those ones among the allocation subcarriers, which are located on the higher frequency side. In such a case, 200 subcarriers located on the higher frequency side among the 204 subcarriers are configured as the mapping subcarriers, and 4 subcarriers located on the lower frequency side are not configured as the mapping subcarriers. Stated in another way, 4 subcarriers located on the lower frequency side are excluded.

<Configuring Method 2>

For example, controller 201 may configure, as the mapping subcarriers, those ones among the allocation subcarriers, which are located on the lower frequency side. In such a case, 200 subcarriers located on the lower frequency side among 204 subcarriers are configured as the mapping subcarriers, and 4 subcarriers located on the higher frequency side are not configured as the mapping subcarriers.

<Configuring Method 3>

For example, controller 201 may configure, as the mapping subcarriers, those ones among the allocation subcarriers except for the subcarriers located on both the lower frequency side and the higher frequency side. In such a case, 200 among the 204 subcarriers except for 2 subcarriers located on the higher frequency side and 2 subcarriers located on the lower frequency side are configured as the mapping subcarriers. The number of subcarriers excluded on each of the higher frequency side and the lower frequency side is not limited to a particular value. In the above-described case, for example, 1 subcarrier located on the higher frequency side and 3 subcarriers located on the lower frequency side may be excluded.

According to Configuring Methods 1 to 3, the mapping subcarriers are configured on at least one of the higher frequency side and the lower frequency side among the allocation subcarriers. With those methods, the frequency spacing between PRBs making up the mapping resources can be maintained in a uniform state, and degradation of PAPR of the uplink signals can be suppressed. Furthermore, interference from an adjacent band can be suppressed on the side where the mapping resources (mapping subcarriers) are not configured.

<Configuring Method 4>

For example, controller 201 may configure, as the mapping subcarriers, those ones among the allocation subcarriers except for the subcarriers located in a central region. The subcarriers located in the central region may be, for example, any subcarriers different from the subcarriers located on each of the higher frequency side and the lower frequency side. In other words, when those ones among the allocation subcarriers except for the subcarriers located in the central region are configured as the mapping subcarriers, the highest frequency and the lowest frequency of the mapping subcarriers are not changed from those of the allocation subcarriers.

According to Configuring Method 4, those ones among the allocation subcarriers except for the subcarriers located in the central region are configured as the mapping subcarriers. With this method, since Occupied Channel Bandwidth (OCB) of the mapping subcarriers does not become narrower than the band of the allocation subcarriers, a possibility of violating the limitation stipulated by ETSI on OCB can be reduced.

<Configuring Method 5>

For example, controller 201 may configure, as the mapping subcarriers, those ones among the allocation subcarriers except for the subcarriers included in a specific interlace. In the case of the above-described example, among 108 subcarriers included in the interlace #0 and 96 subcarriers included in the interlace #10, the subcarriers except for 4 subcarriers included in the interlace #0 may be configured as the mapping subcarriers. Instead, the subcarriers except for 4 subcarriers included in the interlace #10 may be configured as the mapping subcarriers. On that occasion, a method of selecting the specific interlace from which the subcarriers are to be excluded is not limited to a particular one. For example, the interlace including the smaller number of subcarriers before the exclusion of some subcarriers may be preferentially selected. In the case of the above-described example, among 108 subcarriers included in the interlace #0 and 96 subcarriers included in the interlace #10, 4 subcarriers included in the interlace #10 may be preferentially excluded and the remaining subcarriers may be configured as the mapping subcarriers.

According to Configuring Method 5, since Occupied Channel Bandwidth (OCB) of the mapping subcarriers can be ensured by the interlace to which the excluded subcarriers do not belong, the possibility of violating the limitation stipulated by ETSI on OCB is low. For example, the possibility of violating the limitation stipulated by ETSI on OCB can be further reduced by selecting, as the specific interlace from which some subcarriers are to be excluded, the interlace including the smaller number of subcarriers before the exclusion of the some subcarriers. In addition, the frequency spacing between PRBs making up the mapping resources can be maintained in a uniform state, and degradation of PAPR of the uplink signals can be suppressed.

Controller 201 decides the number and the positions of the mapping subcarriers and outputs, to signal assigner 204, the mapping resource information including information that indicates the decided number and positions of the subcarriers. Moreover, controller 201 outputs the number of the uplink data signals to encoder/modulator 202.

Encoder/modulator 202 executes error correction coding and modulation on the uplink data in accordance with the number of the data signals and outputs the resulting signals to DFT section 203. DFT section 203 executes a DFT process (for example, a FFT process) on the signals that have been received from encoder/modulator 202 and that are the same in number as the data signals, and outputs the resulting output signals to signal assigner 204. Here, since the number of the data signals is a number not including any prime factor different from the specific numbers (2, 3 and 5 in the above-described example), it is possible to suppress an increase in the amount of computation executed in the DFT process (for example, the FFT process) by DFT section 203, and to increase the speed of the DFT process.

Signal assigner 204 maps the signals, received from DFT section 203, in accordance with the positions of the mapping subcarriers. On that occasion, signal assigner 204 does not need to map the signals to the subcarriers different from the mapping subcarriers.

As with controller 201 in mobile station 200, controller 101 in base station 100 may change at least one among the number and the positions of the mapping subcarriers and the number of the data signals to a value different from that in the allocation resource information. Information about a changing method may be shared between mobile station 200 and base station 100. In such a case, mobile station 200 and base station 100 may change at least one among the number and the positions of the mapping subcarriers and the number of the data signals to a value different from that in the allocation resource information in accordance with the same changing method.

For example, IDFT section 108 executes an IDFT process (for example, a FFT process) on the signals that have been received from signal separator 107 and that are the same in number as the data signals, and outputs the processed signals to demodulator/decoder 109. Here, since the number of the data signals is a number not including any prime factor different from the specific numbers (2, 3 and 5 in the above-described example), it is possible to suppress an increase in the amount of computation executed in the IDFT process (for example, the IFFT process) by IDFT section 108, and to increase the speed of the IDFT process.

In the above-described example, the frequency utilization efficiency of the allocation resources can be improved and flexible mapping of the data signals can be realized by deciding the numbers of the data signals and the mapping resources in units of subcarriers. For example, signals different from the uplink data signals may be mapped to resources that are not configured as the mapping resources.

The unit used to express the numbers of the data signal and the mapping resources is not limited to subcarrier. For example, the numbers of the data signal and the mapping resources may be decided in units of sub-PRBs each of which includes the smaller number of subcarriers than PRB (namely, subcarriers smaller than 12). It is to be noted that sub-PRB may be referred to as part of PRB or may be regarded as corresponding to another expression.

Instead, the numbers of the data signal and the mapping resources may be decided in units of PRBs. The following description is made in connection with a second example in which the numbers of the data signal and the mapping resources are decided in units of PRB s.

[Second Example of Allocation Resources and Mapping Resources]

When the numbers of the data signal and the mapping resources are decided in units of PRBs, controller 201 decides any one of numbers that are K times 12 (K is an integer larger than or equal to 1) among numbers being smaller than or equal to the number of the allocation subcarriers and not including any prime factor different from the specific numbers. Here, 12 is the number of subcarriers included in one PRB. Then, controller 201 configures K corresponding to the decided number as the number of PRBs for the mapping resources.

For example, when the mapping resources are decided with respect to the allocation resources illustrated in FIG. 8 as in the above-described example, controller 201 configures, on condition of K=16, 192=K times 12 as the number of the data signals and configures K=16 as the number of PRBs making up the mapping resources.

Controller 201 then decides the positions of the mapping resources corresponding to the configured number of PRBs making up the mapping resources.

As with Configuring Method 1 in the case of configuring the positions of the mapping resources in units of subcarriers, the positions of the mapping resources may be configured to PRBs located on the higher frequency side among the allocation resources in units of PRBs. Instead, as with Configuring Method 2 in the case of configuring the positions of the mapping resources in units of subcarriers, the positions of the mapping resources may be configured to PRBs located on the lower frequency side among the allocation resources in units of PRBs.

For example, when the number of PRBs making up the mapping resources is configured to 16 in the example of FIG. 8, controller 201 may configure, as PRBs making up the mapping resources, 16 PRBs except for one PRB that is included in the interlace #0 and that is given with the lowest frequency. Instead, controller 201 may configure, as PRBs making up the mapping resources, 16 PRBs except for one PRB that is included in the interlace #0 and that is given with the highest frequency.

Furthermore, as with Configuring Method 3 in the case of configuring the positions of the mapping resources in units of subcarriers, the mapping resources may be configured to some PRBs among the allocation resources in units of PRBs except for PRBs located on the higher frequency side and PRBs located on the lower frequency side. Instead, as with Configuring Method 4 in the case of configuring the positions of the mapping resources in units of subcarriers, the mapping resources may be configured to some PRBs among the allocation resources in units of PRBs except for PRBs located in a central region. PRBs located in the central region may be, for example, some PRBs different from PRBs located on the higher frequency side and from PRBs located on the lower frequency side. Instead, as with Configuring Method 5 in the case of configuring the positions of the mapping resources in units of subcarriers, the mapping resources may be configured to PRBs among the allocation resources in units of PRBs except for PRBs included in a specific interlace.

Also in the case of deciding the mapping resources in unit of PRBs, the frequency spacing between PRBs making up the mapping resources can be maintained in a uniform state, and degradation of PAPR of the data signals can be suppressed as in the case of deciding the mapping resources in unit of subcarriers. Furthermore, interference from an adjacent band can be suppressed on the side where the mapping resources are not configured.

In the case of deciding the mapping resources in unit of PRBs, since the resources used for the transmission in mobile station 200 is decided in units of PRBs, installation to mobile station 200 and base station 100 can be facilitated.

According to Embodiment 1, as described above, mapping subcarriers in a number not including any prime factor different from one or more specific numbers (2, 3 and 5 in the above-described example) are selected from among the allocation subcarriers, and the data signals in the same number as the selected mapping subcarriers are mapped to those mapping subcarriers with a one-to-one correspondence. It is hence possible to suppress an increase in the amounts of computations executed in the DFT process and the IDFT process corresponding to the DFT process, and to efficiently utilize the resources. As a result, signals can be appropriately transmitted and received in the operation in the unlicensed band.

Embodiment 2

Embodiment 1 has been described in connection with the example in which the number of the uplink data signals and the mapping resources are decided with respect to the allocation resources and the data signals are mapped to the mapping subcarriers in the same amount as the data signals with a one-to-one correspondence. Embodiment 2 is described below in connection with an example in which a method of mapping the uplink data signals is changed with respect to the allocation resources.

An outline of a communication system, a configuration of a base station, a configuration of a mobile station, and an operation sequence in Embodiment 2 are similar to those in Embodiment 1, and hence detailed description of those points is omitted. In the following, Embodiment 2 is described by referring to the outline of the communication system, the configuration of the base station, and the configuration of the mobile station, which have been described in Embodiment 1.

In Embodiment 2, as in Embodiment 1, for example, when the number indicating the amount of the resources having been allocated to mobile station 200 includes a prime factor different from one or more specific numbers, controller 201 controls the transmission process on an assumption that the resources having been allocated to mobile station 200 and the resources to which the uplink data signals are mapped are different from each other.

For example, when the number of the allocation subcarriers includes a prime factor different from the specific numbers, controller 201 may change at least one among the number and the positions of the subcarriers to which the data signals are mapped and the number of the data signals to a value different from that for the allocated subcarriers.

For example, controller 201 configures the number of the data signals and further configures, from among the allocation subcarriers, the number of the mapping subcarriers to which the data signals are mapped with a one-to-one correspondence. On that occasion, controller 201 selects the configured number of the mapping subcarriers to be the same as the number of the data signals. As described above, the number of the data signals having been configured by controller 201 corresponds to the number of the data signals output from DFT section 203.

Then, controller 201 configures one or more subcarriers to which one or more repetition data signals are mapped. The subcarriers to which the repetition data signals are mapped are, for example, at least part of the subcarriers among the allocation subcarriers except for the mapping subcarriers. The subcarriers to which the repetition data signals are mapped are also referred to as duplicate mapping subcarriers in some cases.

In the above-described case, the data signals mapped to the mapping subcarriers do not overlap with each other. On the other hand, the data signals mapped to the duplicate mapping subcarriers overlap with any of the data signals mapped to the mapping subcarriers. Stated in another way, the data signals mapped to the mapping subcarriers are repeatedly mapped to the duplicate mapping subcarriers.

An example implemented according to Embodiment 2 is described below by referring to the example of FIG. 8. For example, when the allocation resources illustrated in FIG. 8 are allocated to mobile station 200, controller 201 decides that the allocation resources are the interlaces #0 and #10. Then, controller 201 decides that the number of the allocation subcarriers is 204.

Then, controller 201 determines whether the number of the allocation subcarriers includes a prime factor different from the specific numbers. In the case in which the specific numbers are 2, 3 and 5, for example, because the number of the allocation subcarriers is 204=2×2×3×17, controller 201 determines that the number of the allocation subcarriers includes a prime factor, namely 17, different from 2, 3 and 5.

In the above-mentioned case, controller 201 in Embodiment 2 may configure, as the number of the data signals and the number of the mapping subcarriers, any one of numbers that are smaller than or equal to the number of the allocation subcarriers and that do not include any prime factor different from the specific numbers (namely, that include only the specific numbers as prime factors thereof).

For example, a maximum one among numbers that are smaller than or equal to the number of the allocation subcarriers and that do not include any prime factor different from the specific numbers may be configured as the number of the data signals and the number of the mapping subcarriers.

In the case of the above-described example, the number of the allocation subcarriers is 204 and the specific numbers are 2, 3 and 5. In that case, the maximum one among the numbers that are smaller than or equal to the number of the allocation subcarriers and that do not include any prime factor different from the specific numbers is 200 (=$2^3 \times 5^2$).

In the above-described case, controller 201 configures the number of the data signals and the number of the mapping subcarriers to 200 and further configures the number of the data signals mapped to the subcarriers with a one-to-one correspondence to 200. Then, controller 201 configures, as the duplicate mapping subcarriers, 4 subcarriers among the number 204 of the allocation subcarriers except for the number 200 of the mapping subcarriers. Controller 201 may configure, as the duplicate mapping subcarriers, part (for example, 1 to 3) among those 4 subcarriers. In such a case, signals do not need to be mapped to the subcarriers that have been not configured as the mapping subcarriers and the duplicate mapping subcarriers.

Controller 201 configures the positions of the mapping subcarriers and the positions of the duplicate mapping subcarriers from among the allocation subcarriers. A method of configuring the positions of the mapping subcarriers may be any one of Configuring Methods 1 to 5 described in Embodiment 1. Instead, the mapping subcarriers may be configured arbitrarily (for example, at random).

Then, controller 201 configures, from among the data signals mapped to the 200 mapping subcarriers with a one-to-one correspondence, the data signals mapped to the duplicate mapping subcarriers.

For example, controller 201 may configure, as the data signals mapped to the duplicate mapping subcarriers, first 4 data signals among the 200 data signals that are output from DFT section 203 and that are mapped to the mapping subcarriers.

Here, the first 4 data signals may be 4 data signals at the head of the output signals when the order of outputs from DFT section 203 is specified. For example, since the DFT process is executed as time-frequency conversion, the specified order may be given in terms of frequency in the DFT process.

For example, when indexes #0 to #199 are assigned to the 200 data signals output from DFT section 203, the data signals assigned with the indexes #0 to #3 correspond to the first 4 data signals.

For example, the data signals #0 to #199 are mapped in order starting from the subcarrier at the lowest frequency in the allocation subcarriers, and the data signals #0 to #3 are then mapped repeatedly. Thus, in such a case, the data signals are mapped in order of #0 to #199 and #0 to #3 starting from the lowest frequency in the allocation subcarriers. A rise of PAPR can be suppressed by using the above-mentioned method.

Controller 201 outputs, to signal assigner 204, the mapping resource information including information that indicates the number and the positions of the mapping subcarriers, the number and the positions of the duplicate mapping subcarriers, and the data signals mapped to the duplicate mapping subcarriers. Controller 201 further outputs information about the number of the uplink data signals, namely information about the number of the mapping subcarriers, to encoder/modulator 202.

Encoder/modulator 202 executes error correction coding and modulation on the uplink data in accordance with the number of the data signals and outputs the resulting signals to DFT section 203. DFT section 203 executes a DFT process (for example, a FFT process) on the signals received from encoder/modulator 202 and outputs the resulting output signals to signal assigner 204. Here, since the number of the data signals is a number not including any prime factor different from the specific numbers (2, 3 and 5 in the above-described example), it is possible to suppress an increase in the amount of computation executed in the DFT process (for example, the FFT process) by DFT section 203, and to increase the speed of the DFT process.

Signal assigner 204 maps the signals, received from DFT section 203, to the mapping subcarriers in accordance with the positions of the mapping subcarriers. Then, signal assigner 204 repeatedly maps the data signals to the duplicate mapping subcarriers in accordance with the information indicating the positions of the duplicate mapping subcarriers and the data signals mapped to the duplicate mapping subcarriers.

Although detailed description is omitted, as with controller 201 in mobile station 200, controller 101 in base station 100 may change at least one among the number and the positions of the mapping subcarriers and the number of the data signals to a value different from that in the allocation resource information. Information about a changing method may be shared between mobile station 200 and base station 100. In such a case, mobile station 200 and base station 100 may change at least one among the number and the positions of the mapping subcarriers and the number of the data signals to a value different from that in the allocation resource information in accordance with the same changing method.

For example, IDFT section 108 receives, from signal separator 107, the signals that have been mapped to the mapping subcarriers and that are the same in number as the mapping subcarriers, executes an IDFT process (for example, a FFT process), and outputs the processed signals to demodulator/decoder 109. Furthermore, IDFT section 108 may receive, from signal separator 107, the signals that have been mapped to the duplicate mapping subcarriers, and may execute an interpolation process before or after the IDFT process. Here, since the number of the data signals, namely the number of the mapping subcarriers, is a number not including any prime factor different from the specific numbers (2, 3 and 5 in the above-described example), it is possible to suppress an increase in the amount of computation executed in the IDFT process (for example, the IFFT process) by IDFT section 108, and to increase the speed of the IDFT process.

According to Embodiment 2, as described above, mapping subcarriers in a number not including any prime factor different from one or more specific numbers (2, 3 and 5 in the above-described example) are selected from among the allocation subcarriers, and the data signals in the same number as the selected mapping subcarriers are mapped to those mapping subcarriers with a one-to-one correspondence. Furthermore, the data signals are repeatedly mapped to some subcarriers (duplicate mapping subcarriers) that are included in the allocation subcarriers and that are different from the mapping subcarriers. It is hence possible to suppress an increase in the amounts of computations executed in the DFT process and the IDFT process corresponding to the DFT process, and to efficiently utilize the resources. As a result, signals can be appropriately transmitted and received in the operation in the unlicensed band. In addition, since Occupied Channel Bandwidth (OCB) of the mapping subcarriers does not become narrower than the band of the allocation subcarriers, the possibility of violating the limitation stipulated by ETSI on OCB can be reduced.

Moreover, according to Embodiment 2, since part of the data signals is repeatedly transmitted in the frequency domain, reliability of the data signals can be improved.

Embodiment 3

Embodiment 1 and Embodiment 2 have been described in connection with the example in which the number indicating the amount of the mapping resources is decided. Embodiment 3 is described below in connection with an example of the method of deciding the amount of the data signals (or the number of the data signals) in a different manner from those in Embodiment 1 and Embodiment 2.

An outline of a communication system, a configuration of a base station, a configuration of a mobile station, and an operation sequence in Embodiment 3 are similar to those in Embodiment 1, and hence detailed description of those points is omitted. In the following, Embodiment 3 is described by referring to the outline of the communication system, the configuration of the base station, and the configuration of the mobile station, which have been described in Embodiment 1.

In Embodiment 3, as in Embodiment 1, for example, when the number indicating the amount of the resources having been allocated to mobile station 200 includes a prime factor different from one or more specific numbers, controller 201 controls the transmission process on an assumption that the resources having been allocated to mobile station 200 and the resources to which the uplink data signals are mapped are different from each other.

For example, when the number of the allocation subcarriers includes a prime factor different from the specific numbers, controller 201 may change at least one among the number and the positions of the mapping subcarriers and the number of the data signals to a value different from that in the allocation resource information.

For example, controller 201 in Embodiment 3 may configure, as the number of the data signals output from DFT section 203, any one of numbers that are larger than or equal to the number of the allocation subcarriers (or larger than the number of the allocation subcarriers) and that do not include any prime factor different from the specific numbers (namely, that include only the specific numbers as prime factors thereof). In the following description, the data signals output from DFT section 203 are referred to as "output data signals" in some cases.

For example, a minimum one among numbers that are larger than or equal to the number of the allocation subcarriers and that do not include any prime factor different from the specific numbers may be configured as the number of the output data signals.

Then, controller 201 outputs the mapping resource information including the configured number of the output data signals to signal assigner 204. Controller 201 further outputs information about the number of the output data signal to encoder/modulator 202.

Encoder/modulator 202 executes error correction coding and modulation on the uplink data in accordance with the number of the output data signals and outputs the resulting output signals to DFT section 203. The number of the signals output to DFT section 203 corresponds to the number of the output data signals.

DFT section 203 executes a DFT process (for example, a FFT process) on the signals received from encoder/modulator 202 and outputs the resulting output data signals to signal assigner 204. Here, since the number of the output data signals is a number not including any prime factor different from the specific numbers (for example, 2, 3 and 5), it is possible to suppress an increase in the amount of computation executed in the DFT process (for example, the FFT process) by DFT section 203, and to increase the speed of the DFT process.

Signal assigner 204 maps the signals received from DFT section 203. In Embodiment 3, the number of the signals received from DFT section 203, namely the number of the output data signals, is larger than the number of the allocation subcarriers. Therefore, signal assigner 204 does not need to map part of the signals received from DFT section 203.

As with controller 201 in mobile station 200, controller 101 in base station 100 may change at least one among the number and the positions of the mapping subcarriers and the number of the data signals to a value different from that in the allocation resource information. Information about a changing method may be shared between mobile station 200 and base station 100. In such a case, mobile station 200 and base station 100 may change at least one among the number and the positions of the mapping subcarriers and the number of the data signals to a value different from that in the allocation resource information in accordance with the same changing method.

An example implemented according to Embodiment 3 is described below by referring to the example of FIG. 8. For example, when the allocation resources illustrated in FIG. 8 are allocated to mobile station 200, controller 201 decides that the allocation resources are the interlaces #0 and #10. Then, controller 201 decides that the number of the allocation subcarriers is 204.

Then, controller 201 determines whether the number of the allocation subcarriers includes a prime factor different from the specific numbers. In the case in which the specific numbers are 2, 3 and 5, for example, because the number of the allocation subcarriers is 204=2×2×3×17, controller 201 determines that the number of the allocation subcarriers includes a prime factor, namely 17, different from 2, 3 and 5.

In the case of the above-described example, the number of the allocation subcarriers is 204 and the specific numbers are 2, 3 and 5. In that case, the minimum one among the numbers that are larger than or equal to the number of the allocation subcarriers and that do not include any prime factor different from the specific numbers is 216 (=$2^3 \times 3^3$).

In the above-described case, controller 201 configures the number of the output data signals to 216. Then, controller 201 outputs the mapping resource information including the configured number of the output data signals to signal assigner 204. Controller 201 further outputs information about the number of the output data signal to encoder/modulator 202.

In the case of the above-described example, the signals received from DFT section 203, namely the 216 output data signals, are 12 more than the 204 allocation subcarriers. Therefore, signal assigner 204 does not need to map at least 12 output data signals.

According to Embodiment 3, as described above, any one of the numbers that are larger than or equal to the number of the allocation subcarriers and that do not include any prime factor different from the specific numbers (namely, that include only the specific numbers as prime factors thereof) is configured as the number of the data signals output from DFT section 203. This method makes it possible to suppress an increase in the amounts of computations executed in the DFT process and the IDFT process corresponding to the DFT process, and to efficiently utilize the resources. As a result, signals can be appropriately transmitted and received in the operation in the unlicensed band. In addition, the above-mentioned method can realize efficient use of the allocation subcarriers and can increase a transfer speed.

Embodiment 4

Embodiment 3 has been described in connection with the example in which the number of the output data signals is configured to be larger than or equal to the number of the allocation subcarriers and part of the output data signals output from DFT section 203 is not mapped to the subcarriers. Embodiment 4 is described below in connection with an example in which part of the output data signals output from DFT section 203 is mapped to resources different from the allocation subcarriers.

An outline of a communication system, a configuration of a base station, a configuration of a mobile station, and an operation sequence in Embodiment 4 are similar to those in Embodiment 1, and hence detailed description of those points is omitted. In the following, Embodiment 4 is described by referring to the outline of the communication system, the configuration of the base station, and the configuration of the mobile station, which have been described in Embodiment 1.

In Embodiment 4, as in Embodiment 3, controller 201 configures the number of the output data signals.

Then, controller 201 outputs the mapping resource information including the configured number of the output data signals to signal assigner 204. Controller 201 further outputs information about the number of the output data signal to encoder/modulator 202.

Encoder/modulator 202 executes error correction coding and modulation on the uplink data in accordance with the number of the output data signals and outputs the resulting signals to DFT section 203. The number of the signals output to DFT section 203 corresponds to the number of the output data signals.

DFT section 203 executes a DFT process (for example, a FFT process) on the signals received from encoder/modulator 202 and outputs the resulting output data signals to signal assigner 204. Here, since the number of the output data signals is a number not including any prime factor different from the specific numbers (for example, 2, 3 and 5), it is possible to suppress an increase in the amount of computation executed in the DFT process (for example, the FFT process) by DFT section 203, and to increase the speed of the DFT process.

Signal assigner 204 maps the signals received from DFT section 203. In Embodiment 4, as in Embodiment 3, the number of the signals received from DFT section 203, namely the number of the output data signals, is larger than the number of the allocation subcarriers. In Embodiment 4, signal assigner 204 maps part of the output data signals received from DFT section 203 to resources different from the allocation subcarriers. In the following description, the output data signals mapped to the resources different from the allocation subcarriers are also referred to as extra data signals in some cases. The extra data signals correspond to at least part or all of the output data signals that are not mapped to the allocation subcarriers.

For example, the extra data signals may be mapped to resources that are not allocated to mobile station 200. Selection of the resources not allocated to mobile station 200 may be executed by, for example, controller 201.

For example, controller 201 may select some subcarriers in the same number as the extra data signals from among subcarriers positioned between the allocation subcarriers. Information indicating the positions of the selected subcarriers may be included in the mapping resource information and output to signal assigner 204. Information about a method of selecting the subcarriers may be made known in mobile station 200 and base station 100 in advance or may be indicated from base station 100 to mobile station 200. Instead, the information about the method of selecting the subcarriers and/or the information indicating the positions of the selected subcarriers may be indicated from mobile station 200 to base station 100.

In the above-mentioned case, signal assigner 204 may map the extra data signals to the selected subcarriers in accordance with the mapping resource information.

As with controller 201 in mobile station 200, controller 101 in base station 100 may change at least one among the number and the positions of the mapping subcarriers and the number of the data signals to a value different from that in the allocation resource information. Information about a changing method may be shared between mobile station 200 and base station 100. In such a case, mobile station 200 and base station 100 may change at least one among the number and the positions of the mapping subcarriers and the number of the data signals to a value different from that in the allocation resource information in accordance with the same changing method.

An example implemented according to Embodiment 4 is described below by referring to the example of FIG. 8. For example, when the allocation resources illustrated in FIG. 8 are allocated to mobile station 200, controller 201 configures the number of the output data signals to 216 as in the example described in Embodiment 3.

In the case of the above-described example, the signals received from DFT section 203, namely the 216 output data signals, are 12 more than the 204 allocation subcarriers. Therefore, signal assigner 204 maps at least 12 extra data signals to resources different from the allocation subcarriers.

According to Embodiment 4, as described above, any one of the numbers that are larger than or equal to the number of the allocation subcarriers and that do not include any prime factor different from the specific numbers (namely, that include only the specific numbers as prime factors thereof) is configured as the number of the data signals output from DFT section 203. This method makes it possible to suppress an increase in the amounts of computations executed in the DFT process and the IDFT process corresponding to the DFT process, and to efficiently utilize the resources. As a result, signals can be appropriately transmitted and received in the operation in the unlicensed band. In addition, the above-mentioned method can realize efficient use of the allocation subcarriers and can increase a transfer speed.

Furthermore, according to Embodiment 4, the data signals output from DFT section 203 can be all transmitted by using, in addition to the allocation resources, the resources that are not allocated to mobile station 200. Hence the transfer speed can be improved, and the signal transmission can be performed with high reliability.

Embodiment 4 has been described above in connection with the example in which the resources to which the extra data signals are mapped are selected in units of subcarriers. Since the resources are selected in units of subcarriers, the resources for use in the signal transmission can be configured flexibly.

In Embodiment 4, the resources to which the extra data signals are mapped may be selected in units of PRBs.

For example, controller 201 may select, from among PRBs positioned between PRBs making up the allocation resources, some PRBs in amount enough to allow mapping of the extra data signals thereto. Information indicating positions of the selected PRBs may be included in the mapping resource information and output to signal assigner 204.

Thus, since the resources to which the extra data signals are mapped are selected in units of RPBs, the signal transmission and reception processes can be executed in units of RPBs and hence easier installation can be realized.

Embodiment 5

Embodiment 5 is described below in connection with an example in which any one of the above-described methods according to Embodiments 1 to 4 is used depending on the number of the allocation subcarriers, for example. It is to be noted that description of the methods already described in Embodiments 1 to 4 is omitted as appropriate.

An outline of a communication system, a configuration of a base station, a configuration of a mobile station, and an operation sequence in Embodiment 5 are similar to those in Embodiment 1, and hence detailed description of those points is omitted. In the following, Embodiment 5 is described by referring to the outline of the communication system, the configuration of the base station, and the configuration of the mobile station, which have been described in Embodiment 1.

In Embodiment 5, as in Embodiment 1 and so on, for example, when the number indicating the amount of the resources having been allocated to mobile station 200 includes a prime factor different from one or more specific numbers, controller 201 controls the transmission process on an assumption that the resources having been allocated to mobile station 200 and the resources to which the uplink data signals are mapped are different from each other.

For example, when the number of the allocation subcarriers includes a prime factor different from the specific numbers, controller 201 may change at least one among the number and the positions of the mapping subcarriers and the number of the data signals to a value different from that in the allocation resource information.

For example, controller 201 in Embodiment 5 may configure, as the number of the output data signals output from DFT section 203, one of numbers that do not include any prime factor different from the specific numbers (namely, that include only the specific numbers as prime factors thereof), the one number being closest to the number of the allocation subcarriers.

For example, when the configured number of the output data signals is smaller than or equal to the number of the allocation subcarriers, controller 201 decides, from among the allocation subcarriers, the mapping subcarriers to which the output data signals are mapped, as in Embodiments 1 and 2.

In the above-mentioned case, as in Embodiment 1, those ones of the allocation subcarriers, which are not included in the mapping subcarriers, do not need to be used. Instead, as in Embodiment 2, the output data signals may be repeatedly mapped to those ones of the allocation subcarriers, which are not included in the mapping subcarriers.

As another example, when the configured number of the output data signals is larger than or equal to the number of the allocation subcarriers, controller 201 maps, to the allocation subcarriers, the output data signals in the same number as the allocation subcarriers like Embodiments 3 and 4.

In the above-mentioned case, as in Embodiment 3, the output data signals (the extra data signals) not mapped to the allocation subcarriers may be excluded. Instead, as in Embodiment 4, the output data signals (the extra data signals) not mapped to the allocation subcarriers may be mapped to other resources than being allocated.

An example implemented according to Embodiment 5 is described below by referring to the example of FIG. 8. For example, when the allocation resources illustrated in FIG. 8 are allocated to mobile station 200, controller 201 decides that the allocation resources are the interlaces #0 and #10. Then, controller 201 decides that the number of the allocation subcarriers is 204.

Then, controller 201 configures the number of the output data signals to 200 for the reason that the number closest to the number of the allocation subcarriers among the numbers not including any prime factor different from the specific numbers (2, 3 and 5) is 200 ($=2^3 \times 5^2$).

In the above-mentioned case, since the configured number of the output data signals is smaller than the number of the allocation subcarriers, controller 201 decides, from among the allocation subcarriers, the mapping subcarriers to which the output data signals are mapped, as in Embodiments 1 and 2. Furthermore, as in Embodiment 1, those ones of the allocation subcarriers, which are not included in the mapping subcarriers, do not need to be used. Instead, as in Embodiment 2, the output data signals may be repeatedly mapped to those ones of the allocation subcarriers, which are not included in the mapping subcarriers.

According to Embodiment 5, as described above, any one of the above-described methods according to Embodiments 1 to 4 is used depending on the number of the allocation subcarriers. Those methods make it possible to suppress an increase in the amounts of computations executed in the DFT process and the IDFT process corresponding to the DFT process, and to efficiently utilize the resources. As a result, signals can be appropriately transmitted and received in the operation in the unlicensed band. In addition, those methods can suppress a reduction in the frequency utilization rate of the allocation subcarriers and a fall of the transfer speed. Moreover, those methods can suppress not only an increase in usage rate of the resources that are not allocated, but also degradation of reliability in transmission and reception of the signals.

Other Embodiment 1

Embodiment 1 to 5 have been described above in connection the example of the interlace configuration in which the numbers assigned to the interlaces with a larger value of N are smaller than the numbers assigned to the interlaces with a smaller value of N. In the interlace configuration illustrated in FIG. 2, for example, the numbers assigned to the interlaces of N=8 are 0 to 9 while the numbers assigned to the interlaces of N=9 are 10 and 11. The present disclosure is not limited to that example. Other Embodiment 1 is described below in connection with an example in which the interlace configuration is different from that illustrated in FIG. 2.

Figure 9:
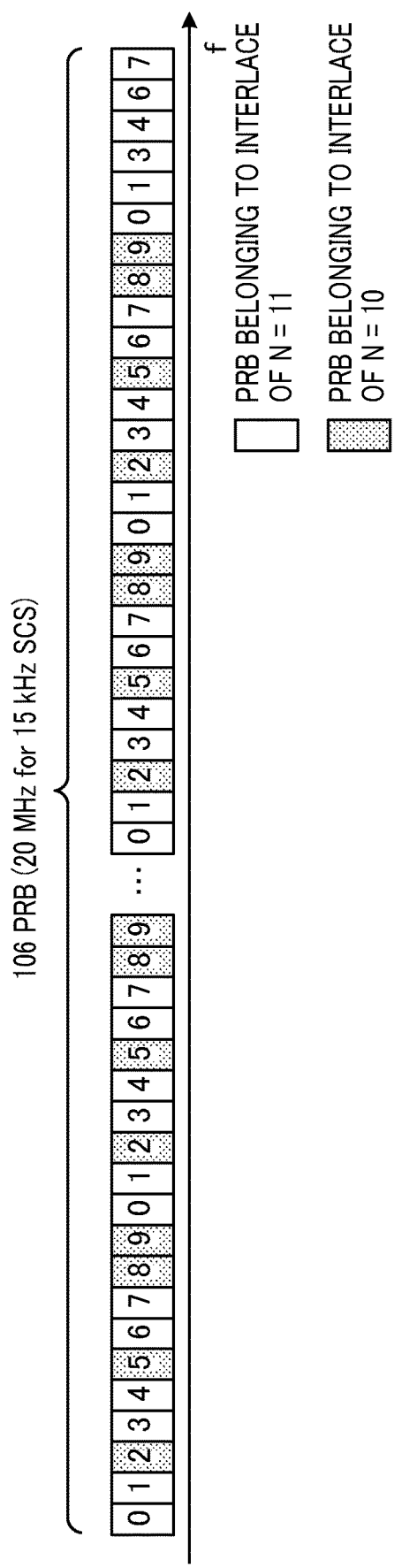
FIG. 9 illustrates another example of the interlace configuration in NR-U.

FIG. 9 illustrates another example of the interlace configuration in NR-U. FIG. 9 represents an example in which M and N indicating the interlace configuration are given by (M, N)=(10, 10 or 11).

In FIG. 9, numbers 0, 1, 3, 4, 6 and 7 are assigned to the interlaces of N=11 (namely, the interlaces each including 11 PRBs), and numbers 2, 5, 8 and 9 are assigned to the interlaces of N=10 (namely, the interlaces each including 10 PRBs).

The following description is made, by way of example, in connection with the case in which controller 101 in base station 100 allocates three interlaces to mobile station 200 in accordance with the interlace configuration illustrated in FIG. 9. In that case, it may be assumed to adopt an allocation method of allocating the interlaces assigned with consecutive numbers to mobile station 200. Under such an assumption, the interlaces assigned with three consecutive numbers (for example, interlaces #0, #1 and #2) in the interlace configuration illustrated in FIG. 9 are assigned to mobile station 200.

For example, when the interlaces #0, #1 and #2 are assigned to mobile station 200, the number of PRBs in the allocation resources allocated to mobile station 200 is 32 in total. Because one PRB includes 12 subcarriers, the number of the allocation subcarriers allocated to mobile station 200 is 384 (=×3). In this case, the number of the allocation subcarriers assigned to mobile station 200 is a number not including any prime factor different from 2, 3 and 5.

According to Other Embodiment 1, as described above, configuring of the numbers assigned to the interlaces is changed in accordance with both the interlace allocation method in base station 100 and the interlace configuration. Such a method makes it possible to suppress an increase in the amounts of computations executed in the DFT process and the IDFT process corresponding to the DFT process. In addition, the allocation subcarriers can be efficiently used, and the transfer speed can be increased.

Other Embodiment 2

Embodiment 1 has been described above in connection with the example in which the interlaces are arranged to be distributed by arranging PRBs at equal spacings. The present disclosure is not limited to that example, and the interlace configuration may be changed. Other Embodiment 2 is described below in connection with an example in which the interlace includes resources given in a unit other than PRB.

Figure 10:
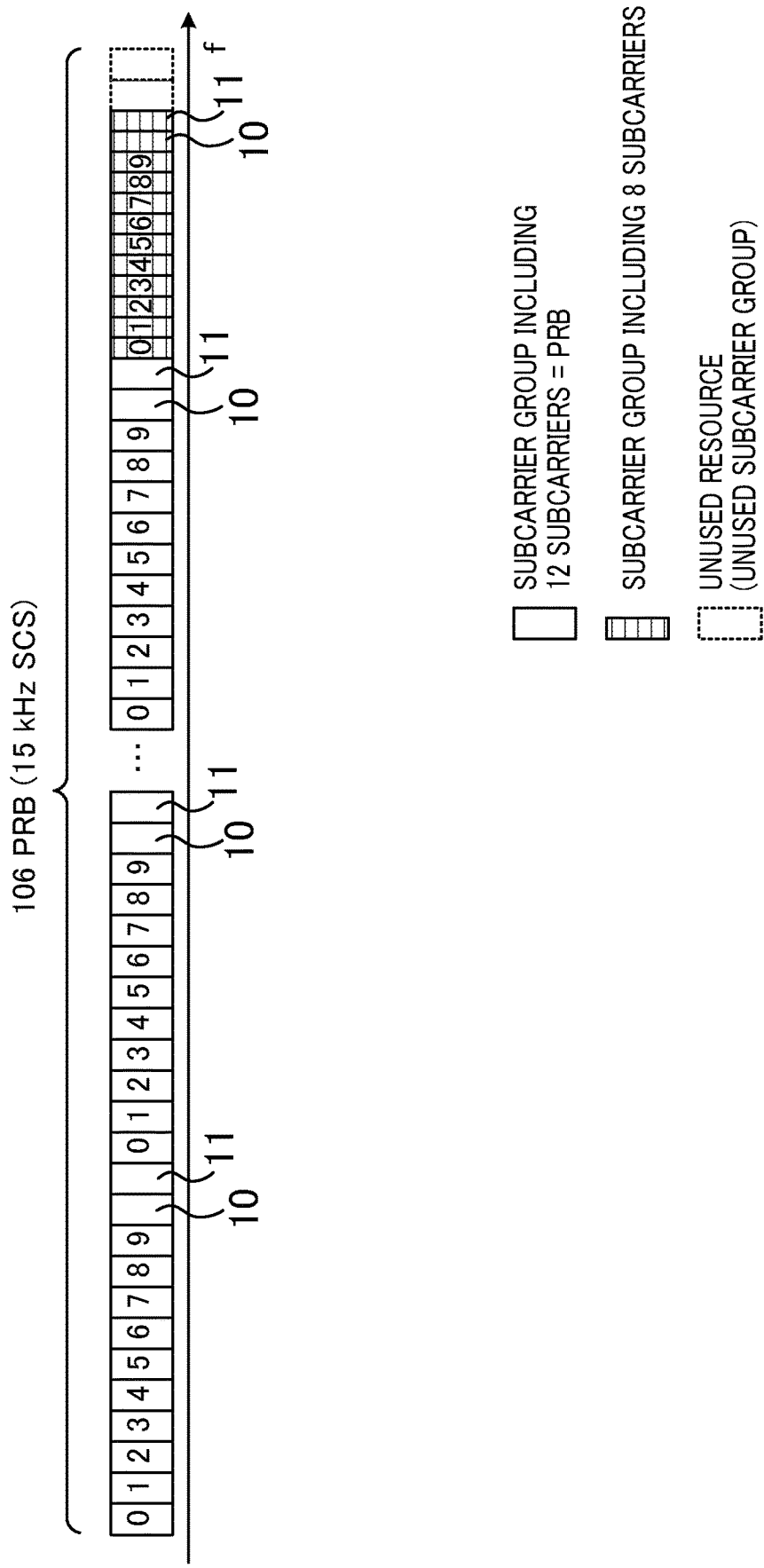
FIG. 10 illustrates an example of an interlace configuration according to Other Embodiment 2.

FIG. 10 illustrates an example of an interlace configuration according to Other Embodiment 2. FIG. 10 represents the example of the interlace configuration in which it is assumed that the maximum assignment number of PRBs is 106 and M=12 is configured. In the example illustrated in FIG. 10, a subcarrier group (namely, PRB) including 12 subcarriers is arranged in a lower frequency range. Furthermore, a subcarrier group including 8 subcarriers is arranged in a higher frequency range. In the following description, the subcarrier group including 8 subcarriers is also referred to as a sub-PRB in some cases.

In the case of the interlace configuration illustrated in FIG. 10, since one interlace includes 8 PRBs and 1 sub-PRB, one interlace includes 96 subcarriers. For example, when one interlace is allocated to mobile station 200, the number of the allocation subcarriers is a number not including any prime factor different from the specific numbers (2, 3 and 5).

Furthermore, when two or more interlaces except for 7 and 11 interlaces are allocated, the number of the allocation subcarriers is also a number not including any prime factor different from the specific numbers (2, 3 and 5) as in the case of allocating one interlace.

According to Other Embodiment 2, as described above, the unit of the resources in the interlace configuration is changed. Such a change makes it possible to suppress an increase in the amounts of computations executed in the DFT process and the IDFT process corresponding to the DFT process. In addition, the allocation subcarriers can be efficiently used, and the transfer speed can be increased.

Other Embodiment 2 has been described in connection with the example in which the unit of the resources arranged in the lower frequency range is PRB and the unit of the resources arranged in the higher frequency range is sub-PRB. In another example, the unit of the resources arranged in the higher frequency range may be PRB, and the unit of the resources arranged in the lower frequency range may be sub-PRB. In still another example, PRB and sub-PRB may be arranged in mixed order without being concentratedly distributed to separate ranges in the frequency domain.

Furthermore, Other Embodiment 2 has been described in connection with the example in which the unit of part of the resources is PRB and the unit of the remaining resources is sub-PRB. In another example, the unit of all the resources may be defined by sub-PRB. Instead, the units of the resources may be defined by a plurality of subcarrier groups including the different numbers of the subcarriers. For example, a subcarrier group including 8 subcarriers and a subcarrier group including 6 subcarriers may be defined as the units of the resources.

In the above embodiments, when any part of the interlaces in the mapping resources is a subcarrier group (for example, sub-PRB) including two or more subcarriers and/or a single subcarrier, a method of arranging a pilot signal (for example, a channel estimation reference signal and Demodulation Reference Signal (DMRS)) in the resource corresponding to the above-mentioned part may be the same as a method of arranging a pilot signal in the case of PRB. Instead, the pilot signal does not need to be arranged in the resource corresponding to the above-mentioned part.

The methods described in the above embodiments may be used alone or in combination. Instead, the method to be used may be switched over depending on situations (for example, communication environment and/or traffic volume). The communication environment may be expressed by at least one of Reference Signal Received Power (RSRP), Received Signal Strength Indicator (RSSI), Reference Signal Received Quality (RSRQ), and Signal-to-Interference plus Noise power Ratio (SINR), or by any one of other suitable parameters. The traffic volume may be expressed by, for example, at least one of the number of the mobile stations connected to the base station, the amount of data transmitted from the mobile station, and the amount of resources that can be allocated to the mobile station, or by any one of other suitable parameters.

While the above embodiments have been described in connection with the example in which the mobile station and the base station adjust (change) the number of the mapping resources and the number of the data signals to be transmitted and received, the present disclosure is not limited to that example.

For example, whether to perform the adjustment and/or the method for the adjustment may be previously determined in the form of standards. For example, both the base station and the mobile station may recognize the same method individually and may perform the adjustment by the same method.

In another example, the above-mentioned points may be explicitly or implicitly indicated from the base station to the mobile station by using the higher layer signal and/or DCI, for example. The mobile station may perform the adjustment in accordance with the indication from the base station. When the above-mentioned points are implicitly indicated, the numbers indicating the allocation resources and/or the interlaces may be used to implicitly indicate the method for the adjustment, for example.

Instead, the mobile station may perform the adjustment and may explicitly or implicitly indicate, to the base station, information indicating the result of the adjustment by using, for example, the higher layer signal and/or UCI (Uplink Control Signal). In such a case, the base station may perform the adjustment in accordance with the indication from the mobile station.

While the operation examples in the above embodiments have been described on an assumption of using the DFT process in the mobile station, the present disclosure is not limited to such a case. For example, the interlace mapping may be realized with the signal waveform based on CP-OFDM (Cyclic Prefix-Orthogonal Frequency Division Multiplexing).

The above embodiments have been described on an assumption of applying the present disclosure to the uplink in which the mobile station corresponds to a transmitter and the base station corresponds to a receiver. In another example, the present disclosure may be applied to the downlink in which the base station corresponds to a transmitter and the mobile station corresponds to a receiver. In still another example, the present disclosure may be applied to a radio communication link (for example, the so-called sidelink) that is established in communication between mobile stations (for example, vehicle-to-vehicle communication). In that case, the mobile stations performing the communication correspond to a transmitter and a receiver. The present disclosure may be further applied to other types of communication and so on without limited to the above-mentioned cases.

The expressions "... section", "... er" and "... or" used to denote the constituent elements of base station 100 and mobile station 200 in the above embodiments may be replaced with other expressions such as "... circuitry", "... device", "... unit" or "... module".

Furthermore, the expressions "specify", "decide", "configure", "determine", and "assume" used in the description of the above embodiments may be read changeably.

The term "higher layer signal" used in the description of the above embodiments may be replaced with a different word such as "RRC (Radio Resource Control signaling) signal".

The acronym "DFT" used in the description of the above embodiments may be replaced with a term such as "Discrete Fourier Transform" or "Transform Precoding".

The acronym "FFT" used in the description of the above embodiments may be replaced with a term such as "Fast Fourier Transform" or "Transform Precoding".

The acronym "IDFT" used in the description of the above embodiments may be replaced with a term such as "Inverse Discrete Fourier Transform".

The acronym "IFFT" used in the description of the above embodiments may be replaced with a term such as "Inverse Fast Fourier Transform".

The resource band width, the number of the subcarriers, the number of PRBs, and so on, which are specified in the frequency domain in the above embodiments, are merely examples, and the present disclosure is not limited to those examples. Moreover, the expressions, such as "subcarrier", "PRB", and "sub-PRB", used to specify the unit for dividing the resources are merely examples and may be replaced with other suitable expressions.

The various embodiments have been described above.

The present disclosure can be realized by software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g. cellular (cell) phone, smart phone), a tablet, a personal computer (PC) (e.g. laptop, desktop, netbook), a camera (e.g. digital still/video camera), a digital player (digital audio/video player), a wearable device (e.g. wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples."

A mobile station according to one exemplary embodiment of the present disclosure includes: transmission circuitry, which, in operation, transmits uplink signals; and control circuitry, which, in operation, when a first number indicating an amount of first resources usable in transmitting the uplink signals includes, as a prime factor, a third number different from a specific second number, controls transmission of a fourth number of signals, the transmission being performed using second resources, the fourth number not including the third number as a prime factor.

The mobile station according to one exemplary embodiment of the present disclosure further includes: a discrete Fourier transformer, which in operation, executes discrete Fourier transform of modulated signals, and outputs the modulated signals after being transformed; and signal assignment circuitry, which in operation, performs mapping of the modulated signals after being transformed to the second resources, and outputs the uplink signals, in which: the control circuitry configures a number of the modulated signals as the fourth number and further configures the second resources based on the first number and the fourth number.

In the mobile station according to one exemplary embodiment of the present disclosure, when the first number is larger than the fourth number, the control circuitry configures, as the second resources, resources obtained by excluding third resources from the first resources.

In the mobile station according to one exemplary embodiment of the present disclosure, the control circuitry configures at least part of the third resources as one or more resources that are used to repeatedly transmit the signals.

In the mobile station according to one exemplary embodiment of the present disclosure, the control circuitry configures, as the third resources, one or more resources that are positioned in at least one of a highest frequency band and a lowest frequency band among the first resources.

In the mobile station according to one exemplary embodiment of the present disclosure, the control circuitry configures, as the third resources, one or more resources that are not positioned in a highest frequency band and a lowest frequency band among the first resources.

In the mobile station according to one exemplary embodiment of the present disclosure, the control circuitry configures part of resources as the third resources, the part being positioned at a predetermined spacing among the first resources along a frequency axis.

In the mobile station according to one exemplary embodiment of the present disclosure, when the first number is smaller than the fourth number, the control circuitry configures the first resources as the second resources that are used to transmit signals obtained by excluding at least part of the fourth number of the signals.

In the mobile station according to one exemplary embodiment of the present disclosure, the control circuitry configures resources different from the first resources as resources that are used to transmit the signals having been excluded.

In the mobile station according to one exemplary embodiment of the present disclosure, the control circuitry decides the second resources in units of subcarriers or units of subcarrier groups.

In the mobile station according to one exemplary embodiment of the present disclosure, the control circuitry decides the second resources in units of physical resource blocks.

In the mobile station according to one exemplary embodiment of the present disclosure, the control circuitry decides, as the fourth number, one among numbers that include the second number as a prime factor and that do not include the third number as a prime factor, the one number being closest to the first number, and executes a different transmission process between when the first number is larger than the fourth number and when the first number is smaller than the fourth number.

A base station according to one exemplary embodiment of the present disclosure includes: reception circuitry, which, in operation, receives uplink signals; and control circuitry, which, in operation, when a first number indicating an amount of first resources usable in transmitting the uplink signals includes, as a prime factor, a third number different from a specific second number, controls reception of a fourth number of signals, the reception being performed using second resources, the fourth number not including the third number as a prime factor.

The base station according to one exemplary embodiment of the present disclosure further includes: signal separation circuitry, which, in operation, separates signals having been mapped to the second resources; and inverse discrete Fourier transform circuitry, which, in operation, executes discrete inverse Fourier transform of the signals having been separated, and outputs output signals; in which: the control circuitry configures a number of the output signals as the fourth number and further configures the second resources based on the first number and the fourth number.

A transmission method according to one exemplary embodiment of the present disclosure includes: configuring, when a first number indicating an amount of first resources usable in transmitting uplink signals includes, as a prime factor, a third number different from a specific second number, the fourth number not including the third number as a prime factor; and controlling transmission of the fourth number of signals, the transmission being performed using second resources.

A reception method according to one exemplary embodiment of the present disclosure includes: configuring, when a first number indicating an amount of first resources usable in transmitting uplink signals includes, as a prime factor, a third number different from a specific second number, a fourth number not including the third number as a prime factor; and controlling reception of the fourth number of signals, the reception being performed using second resources.

A base station according to one exemplary embodiment of the present disclosure includes: reception circuitry, which, in operation, receives uplink signals; and control circuitry, which, in operation, decides first resources usable in transmitting the uplink signals, and controls a reception process of the uplink signals, the reception process being performed using the first resources, in which: the first resources have one or more bands positioned at a predetermined spacing among a plurality of bands that are obtained by dividing a predetermined frequency band, and the control circuitry configures the one or more bands in the first resources such that a number indicating an amount of resources included in the first resources does not include, as a prime factor, a third number different from a specific second number.

A mobile station according to one exemplary embodiment of the present disclosure includes: transmission circuitry, which, in operation, transmits signals; and control circuitry, which, in operation, controls a transmission process of the signals, the transmission process being performed using usable first resources, in which: the first resources have one or more bands positioned at a predetermined spacing among a plurality of bands that are obtained by dividing a predetermined frequency band, at least part of the plurality of bands has a different band width from remaining part, and a number indicating an amount of resources included in the first resources does not include, as a prime factor, a third number different from a specific second number.

The disclosure of Japanese Patent Application No. 2018-206872, filed on Nov. 1, 2018, including the specification, drawings and abstract, is incorporated herein by reference in its entirety.

INDUSTRIAL APPLICABILITY

An example of the present disclosure is advantageously applied to a mobile communication system.

REFERENCE SIGNS LIST

100 Base station
101, 201 Controller
102, 202 Encoder/modulator
103, 204 Signal assigner
104, 205 Transmitter
105, 206 Antenna
106, 207 Receiver
107, 208 Signal separator
108 IDFT section
109, 209 Demodulator/decoder
200 Mobile station
203 DFT section

The invention claimed is:

1. A communication apparatus, comprising:
a receiver, which, in operation, receives resource assignment information indicating a set of interlace indices of a plurality of sets of interlace indices including index sets {#i} and {#i, #j} where i and j are integers larger than or equal to 0; and
a transmitter, which, in operation, transmits an uplink signal on first resource blocks (RBs) within a band,
wherein, a number of the first RBs is the largest integer which is based on one or more specific prime numbers that are two, three and five and which is not greater than a number of second RBs, wherein the number of second RBs is not based on the one or more specific prime numbers and is indicated by the set of interlace indices.

2. The communication apparatus according to claim 1, wherein the first RBs are the lowest RBs among the second RBs indicated by the set of interlace indices.

3. The communication apparatus according to claim 1, wherein each of the interlace indices indicates a plurality of RBs arrayed at an equal spacing in a frequency domain.

4. The communication apparatus according to claim 1, wherein the resource assignment information indicates the set of interlace indices, which includes two {#i, #j} or more interlace indices.

5. The communication apparatus according to claim 1, wherein a size of the uplink signal is determined based on the first RBs.

6. The communication apparatus according to claim 1, wherein each of the interlace indices indicates a different number of RBs.

7. The communication apparatus according to claim 1, wherein the resource assignment information is indicated by downlink control information (DCI).

8. A communication method, comprising:
receiving resource assignment information indicating a set of interlace indices of a plurality of sets of interlace indices including index sets {#i} and {#i, #j} where i and j are integers larger than or equal to 0; and
transmitting an uplink signal on first resource blocks (RBs) within a band,
wherein, a number of the first RBs is the largest integer which is based on one or more specific prime numbers that are two, three and five and which is not greater than a number of second RBs, wherein the number of second RBs is not based on the one or more specific prime numbers and is indicated by the set of interlace indices.

9. The communication method according to claim 8, wherein the first RBs are the lowest RBs among the second RBs indicated by the set of interlace indices.

10. The communication method according to claim 8, wherein each of the interlace indices indicates a plurality of RBs arrayed at an equal spacing in a frequency domain.

11. The communication method according to claim 8, wherein the resource assignment information indicates the set of interlace indices, which includes two {#i, #j} or more interlace indices.

12. The communication method according to claim 8, wherein a size of the uplink signal is determined based on the first RBs.

13. The communication method according to claim 8, wherein each of the interlace indices indicates a different number of RBs.

14. The communication method according to claim 8, wherein the resource assignment information is indicated by downlink control information (DCI).

* * * * *